United States Patent [19]

Bando

[11] Patent Number: 5,970,040
[45] Date of Patent: Oct. 19, 1999

[54] AUTOMATIC DISK CHANGER

[75] Inventor: Takayoshi Bando, Daito, Japan

[73] Assignee: Funai Electric Co., Ltd., Osaka, Japan

[21] Appl. No.: 09/049,132

[22] Filed: Mar. 27, 1998

Related U.S. Application Data

[62] Division of application No. 08/843,841, Apr. 17, 1997.

[30] Foreign Application Priority Data

| Apr. 17, 1996 | [JP] | Japan | 8-94937 |
| Apr. 25, 1996 | [JP] | Japan | 8-104981 |

[51] Int. Cl.⁶ ............................................. G11B 17/04
[52] U.S. Cl. ........................................................ 369/178
[58] Field of Search .................... 369/36–37, 191–192, 369/178, 75.1–75.2, 77.1–77.2; 360/98.04–98.06

[56] References Cited

U.S. PATENT DOCUMENTS

| 4,589,101 | 5/1986 | Schatteman et al. | 369/36 |
| 4,633,452 | 12/1986 | Shimbo et al. | 369/36 |
| 5,119,354 | 6/1992 | Umesaki | 369/36 |
| 5,550,801 | 8/1996 | Enomoto et al. | 369/36 |
| 5,754,502 | 5/1998 | Kamemura | 369/37 |

*Primary Examiner*—Allen T. Cao
*Attorney, Agent, or Firm*—Bacon & Thomas, PLLC

[57] ABSTRACT

An automatic disk changer includes: a casing having a front wall in which an opening through which a number of disk are inserted into the casing, and a disk inserting slit are formed in such a manner that the slit is adjacent to the opening; a disk inserting swing tray which is swingably provided in the slit; and a locking mechanism which locks the swing tray in association with the mounting of a disk, which has been inserted into the casing with the aid of the swing tray, on a player body with the aid of a loading mechanism and a disk mounting mechanism.

4 Claims, 26 Drawing Sheets

FIG.1

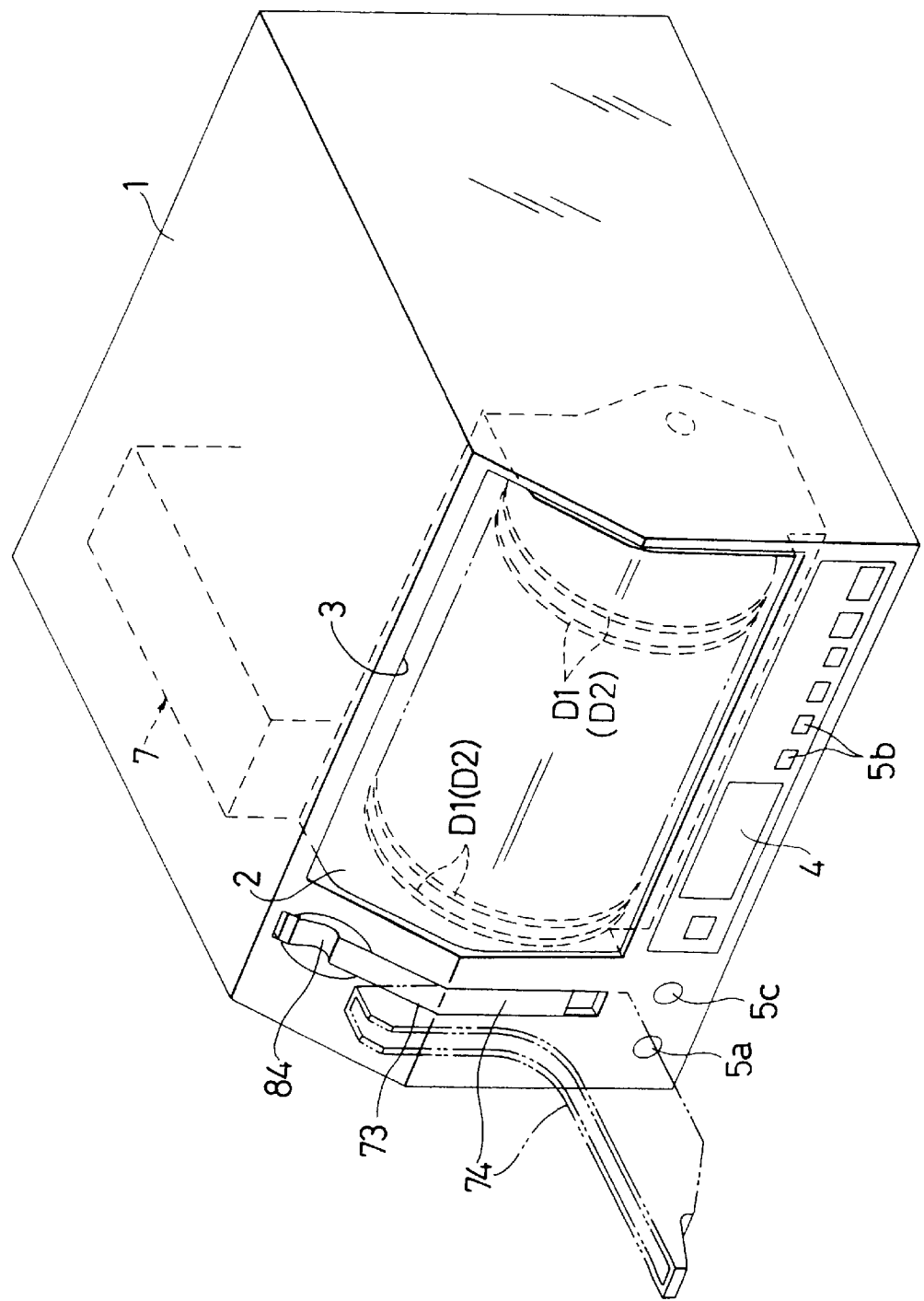

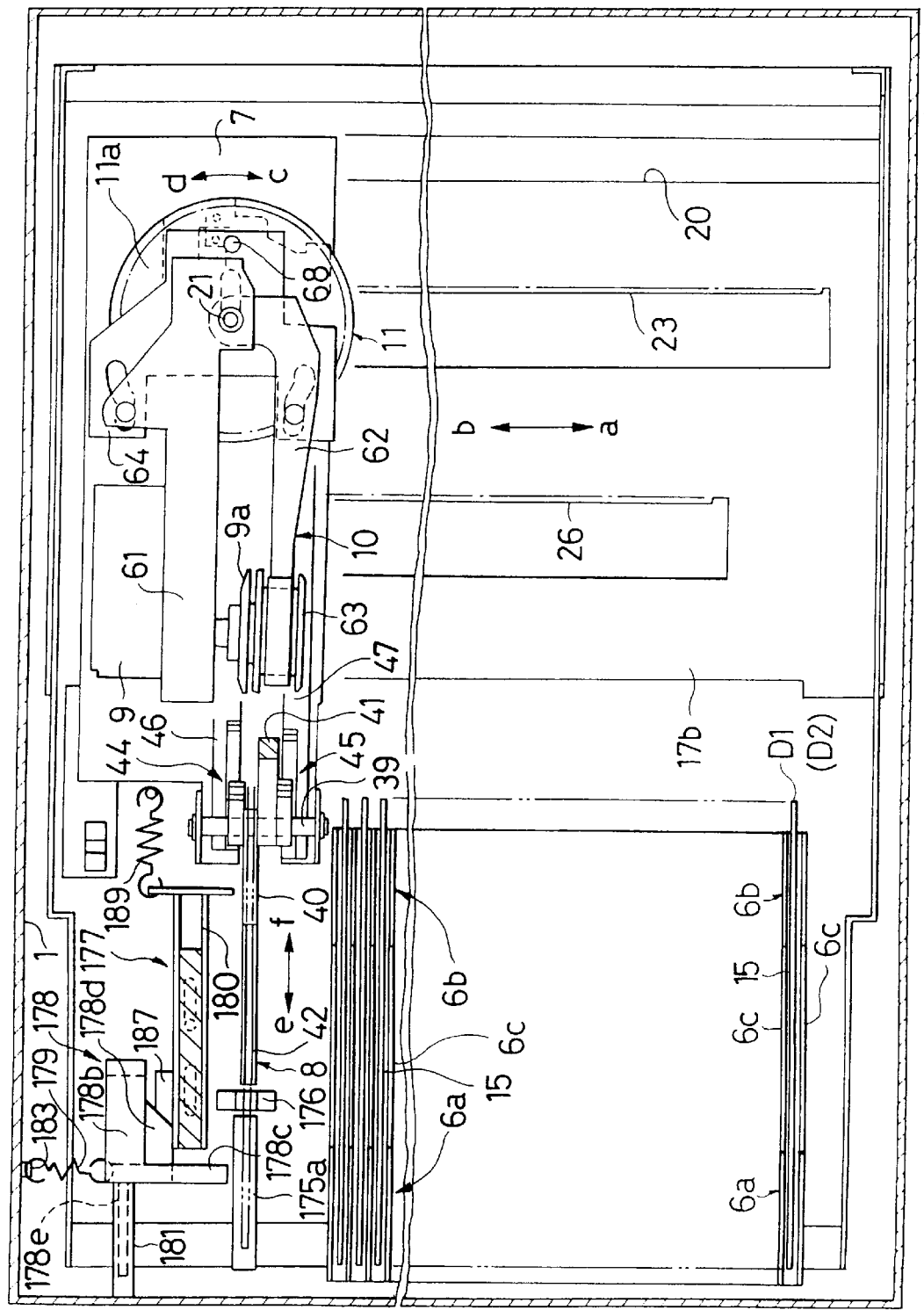

AUTOMATIC DISK CHANGER

This application is a Division of nonprovisional application Ser. No. 08/843,841 filed Apr. 17, 1997 Pending.

BACKGROUND OF THE INVENTION

1. Field of the Invention

This invention relates to an automatic disk changer which picks up a desired one among a plurality of optical disks or magnet-optical disks such as compact disks (CDs) and mini-disks (MDs) which are arranged at predetermined intervals (hereinafter referred to merely as "disks", when applicable) so that data are recorded thereon or reproduced therefrom or erased therefrom.

2. Description of the Related Art

An example of an automatic disk changer of this type has been disclosed in Japanese Patent Unexamined Publication No. Sho. 61-156563. The automatic disk changer comprises a casing in which a disk arranging stand is provided on which a number of disks are arranged at predetermined intervals, and a carriage which is reciprocated along the disk arranging stand. The carriage has: a disk lifting mechanism which is adapted to slightly lift a specified disk among the disks arranged on the disk arranging stand; a loading mechanism which rolls the disk thus lifted to place it on the carriage; a disk mounting mechanism which mounts the disk thus placed on a player body provided on the carriage; and an auxiliary tray mechanism section located adjacent to the disk arranging stand, including an auxiliary tray for inserting only one disk, and a drive mechanism for driving the auxiliary tray back and forth.

In a data reproducing operation with the automatic disk changer, a desired one among a plurality of disks arranged on the disk arranging stand is specified, and the carriage is moved to the disk thus specified. Thereafter, the loading mechanism is operated to clamp the disk and place it on the carriage. Then, the disk mounting mechanism is operated to mount the disk thus placed on the player body provided on the carriage. Under this condition, data are read from the disk with the optical pickup of the player body, thus being reproduced. After the reproduction of data, the disk is returned to its original position on the disk arranging stand with the above-described operations performed in the reverse order.

In the case where it is required to play a disk (to reproduce data from a disk) immediately which has been purchased, the drive mechanism in the auxiliary tray mechanism section is driven to draw the auxiliary tray out of the casing, and the disk is set in the auxiliary tray thus drawn out, and the auxiliary tray together with the disk is retracted into the casing, so that the data are reproduced from the disk in the above-described manner.

In the above-described automatic disk changer, the auxiliary tray mechanism section for playing a particular disk besides a number of disks is intricate in structure, and accordingly high in manufacturing cost.

SUMMARY OF THE INVENTION

In view of the foregoing, an object of the invention is to provide an automatic disk changer in which the mechanism section for playing a particular disk besides a number of disks is simple in structure and is low in manufacturing cost.

In achieving the above object, a first aspect of the invention provides an automatic disk changer comprising: a loading mechanism which loads a specified one among a number of disks which have been inserted into a casing through an opening which is formed in the casing so that disks are inserted in or taken out of the casing; a disk mounting mechanism which receives the specified disk from the loading mechanism and mounts the specified disk on a player body; a disk inserting swing tray which is swingably provided in a slit which is formed in a front wall of the casing in such a manner that the slit is adjacent to the opening; and a locking mechanism which locks the swing tray in association with the mounting of the disk, which has been inserted into the casing with the aid of the swing tray, on the player body with the aid of the loading mechanism and the disk mounting mechanism.

A second aspect of the invention provides an automatic disk changer comprising: a disk arranging stand on which a number of disks are arranged at predetermined intervals which are inserted into a casing through an opening which is formed in the casing so that disks are inserted in or taken out of the casing through the opening; a carriage which is reciprocated along the disk arranging stand, the carriage including a loading mechanism which clamps a predetermined one among the number of disks on the disk arranging stand and delivers the predetermined disk onto the carriage, and a disk mounting mechanism which mounts the disk, which has been thus delivered onto the carriage, on a player body; a disk inserting swing tray which is provided in a slit which is formed in a front wall of the casing in such a manner that the slit is adjacent to the opening, in such a manner that the swing tray is swingable about a lower end thereof forwardly and backwardly; and a locking mechanism which locks the swing tray in association with the mounting of the disk, which has been inserted into the casing with the aid of the swing tray, on the player body with the aid of the loading mechanism and the disk mounting mechanism.

A third aspect of the invention provides an automatic disk changer comprising: a loading mechanism which loads a specified one among a number of disks which have been inserted into a casing through an opening which is formed in the casing so that disks are inserted in or taken out of the casing through the opening; a disk mounting mechanism which receives the specified disk from the loading mechanism and mounts the specified disk on a player body; a disk inserting slit which is formed in a front wall of the casing in such a manner that the slit is adjacent to the opening, and only one disk is inserted into the slit; and a shutter mechanism which closes the disk inserting slit in association with the mounting of the disk, which has been inserted into the slit, on the player body with the aid of the loading mechanism and the disk mounting mechanism.

A fourth aspect of the invention provides an automatic disk changer comprising: a disk arranging stand on which a number of disks are arranged at predetermined intervals which are inserted into a casing through an opening which is formed in the casing so that disks are inserted in or taken out of the casing through the opening; a carriage which is reciprocated along the disk arranging stand, the carriage including a loading mechanism which clamps a predetermined one among the number of disks on the disk arranging stand and delivers the predetermined disk onto the carriage, and a disk mounting mechanism which mounts the disk which has been thus delivered onto the carriage, on a player body; a disk inserting slit which is formed in a front wall of the casing in such a manner that the slit is adjacent to the opening, and only one disk is inserted into the slit; and a shutter mechanism which closes the disk inserting slit in association with the mounting of the disk, which has been inserted into the slit, on the player body with the aid of the loading mechanism and the disk mounting mechanism.

BRIEF DESCRIPTION OF THE DRAWINGS

FIG. 1 is a vertical sectional view showing an automatic disk changer, which constitutes a first embodiment of the invention;

FIG. 25 is a perspective view of the automatic disk changer;

FIG. 26 is a horizontal sectional view showing an automatic disk changer, which constitutes a second embodiment of the invention;

DETAILED DESCRIPTION OF THE PREFERRED EMBODIMENTS

Figure 2:
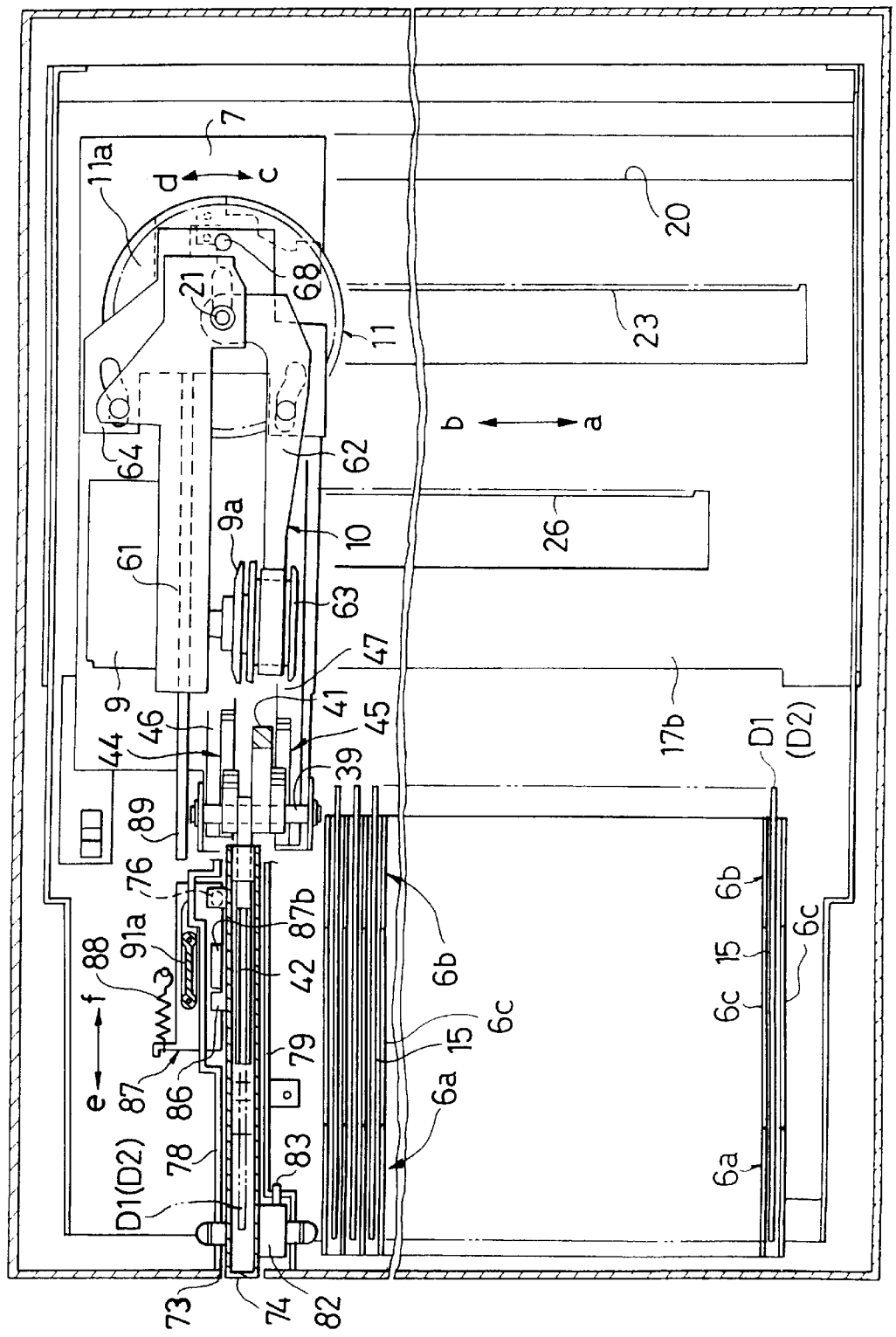
FIG. 2 is a horizontal sectional view of the automatic disk changer shown in FIG. 1.

Preferred embodiments of the invention will be described with reference to the accompanying drawings.

First Embodiment

An automatic disk changer, which constitutes a first embodiment of the invention, is as shown in FIG. 25. The automatic disk changer comprises: a casing 1 which has an opening 3 with a lid 2 in the upper portion of the front wall thereof, and a slit 73 formed in the same front wall in such a manner that it is adjacent to the opening 3. In the slit 73, a disk inserting swing tray 74 is provided in such a manner that it is swingable about its lower end. That is, the casing is so designed that, with the lid 2 opened, a number of large-diameter disks D1 (for instance 12 cm in diameter) and a number of small-diameter disks D2 (for instance 8 cm in diameter) can be inserted into the casing 1 through the opening 3, and one disk D1 or D2 can be inserted into the casing 1 with the aid of the swing tray 74. In the lower portion of the front wall of the casing 1, a display section 4, and a variety of operating switches such as a power switch 5a, disk specifying switches 5b, and a one-disk start switch 5c are provided.

Figure 1:
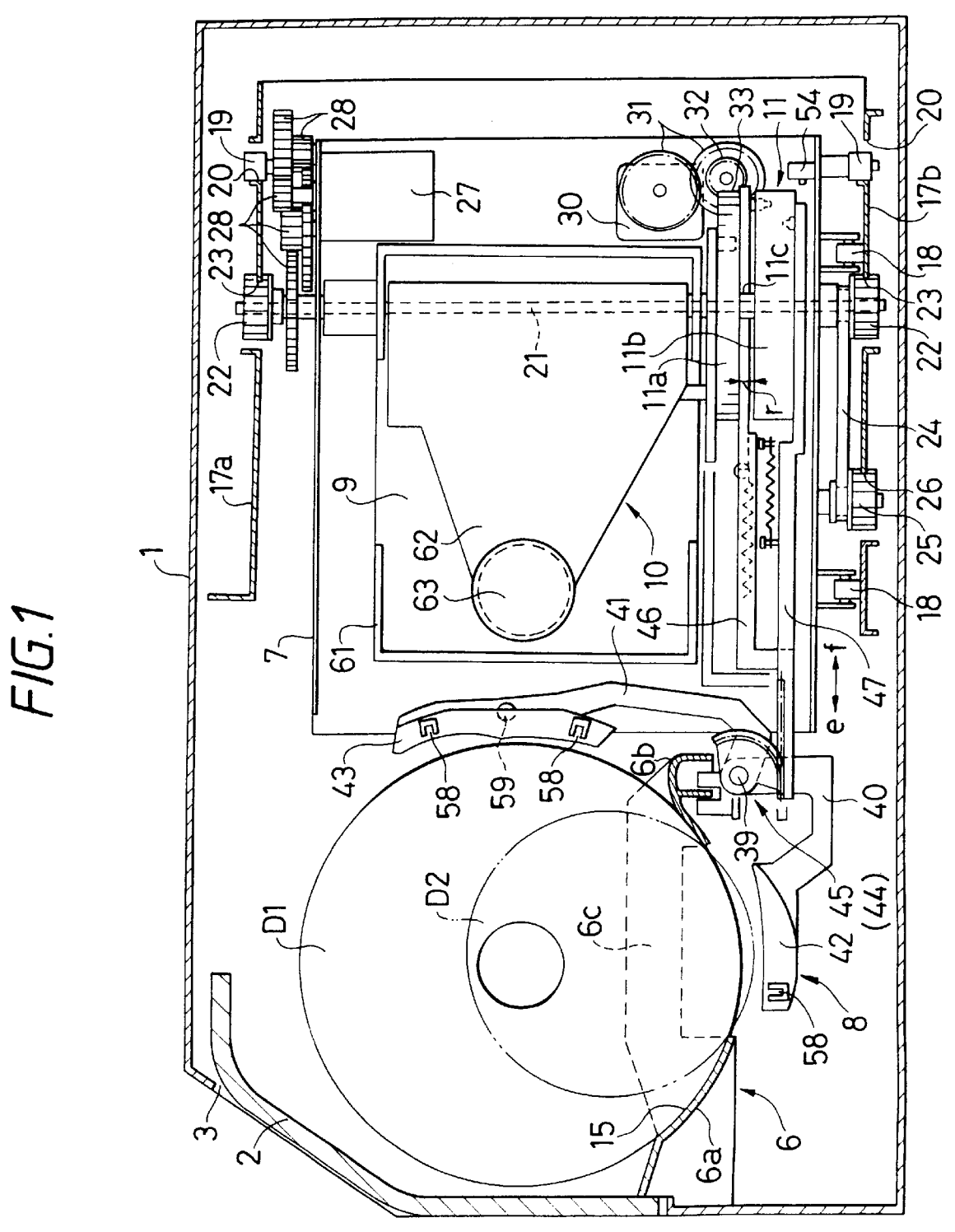

As shown in FIGS. 1 and 2, a disk arranging stand 6, and a carriage 7 are provided inside the casing 1. A number of disks D1 and a number of disks D2 are arranged on the disk arranging stand 6 at predetermined intervals, and the carriage 7 is reciprocated horizontally (in the directions of the arrows a and b) along the disk arranging stand 6. The carriage 7 has a loading mechanism 8 which picks up a specified disk D1 or D2 from the disk arranging stand 6 and places it on the carriage 7, and a disk mounting mechanism 10 which mounts the disk D1 or D2 thus placed on a player body 9. On the carriage 7, a cam 11 for driving the two mechanisms 8 and 10 is rotatably provided. A cam stop switch 13(cf. FIG. 18(b)) is provided between the carriage 7 and the cam 11 which detects when the cam 11 is turned through a predetermined angle in the forward or reverse direction to reach a stop position.

The disk arranging stand 6, as shown in FIGS. 1 and 2, comprises: a pair of a front line section 6a and a rear line section 6b which are arranged in parallel with each other with a predetermined space between them; and a number of guide plates 6c which are arranged parallel at intervals which are slightly larger than the thickness of the disks D1 or D2 longitudinally of the two sections 6a and 6b, thus forming disk inserting grooves 15 between the adjacent guide plates 6c.

In the disk changer thus designed, the disks D1 and D2 can be inserted into the predetermined disk inserting grooves 15 accurately.

The carriage 7, as shown in FIGS. 1 and 2, is arranged between the upper and lower base boards 17a and 17b. More specifically, the carriage 7 is mounted through wheels 18 on the lower base board 17b. Lateral vibration preventing rollers 19 and 19, which are protruded upwardly and downwardly from the carriage 7, are rollingly in abutment with the side edges of elongated holes 20 and 20 which are formed in the upper and lower base boards 17a and 17b, respectively. Pinions 22 and 22 fixedly mounted on both end portions of a supporting shaft 21 which penetrates the carriage 7 vertically, are engaged with racks 23 and 23 of the upper and lower base boards 17a and 17b, respectively. A transmission belt 24 is laid over the lower pinion 22 and another pinion 25 which is engaged with a rack 26 of the lower base board 17b. A carriage motor 27 is provided on the upper portion of the carriage 7. When the carriage motor 27 is driven, the pinions 22, 22 and 25 can be turned in the forward and reverse directions through a gear mechanism 28, so that the carriage 7 is moved in the directions of the arrows a and b.

The aforementioned cam 11, as shown in FIGS. 1 and 2, comprises upper and lower cam units 11a and 11b which are arranged parallel with a predetermined space r between them. The upper and lower cam units 11a and 11b are coupled to each other through a hollow shaft 11c, which is mounted on the supporting shaft 21 in such a manner that it is rotatable in the forward and reverse directions; i.e., in the directions of the arrows c and d. A cam motor 30 provided on the lower portion of the carriage 7 is driven to turn the cam 11 in the forward and reverse directions through a gear mechanism 31, a worm 32, and a gear 33 formed in the outer periphery of the upper cam unit 11a.

Figure 3:
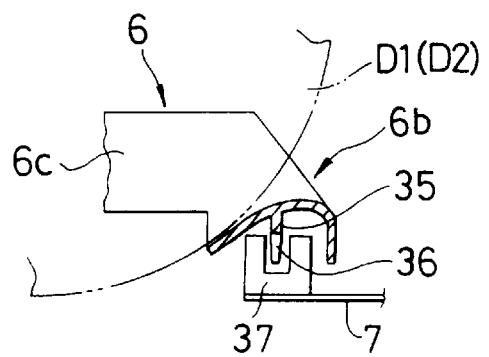
FIG. 3 is a horizontal sectional view showing a rear line section of a disk arranging stand in the automatic disk changer.
Figure 4:
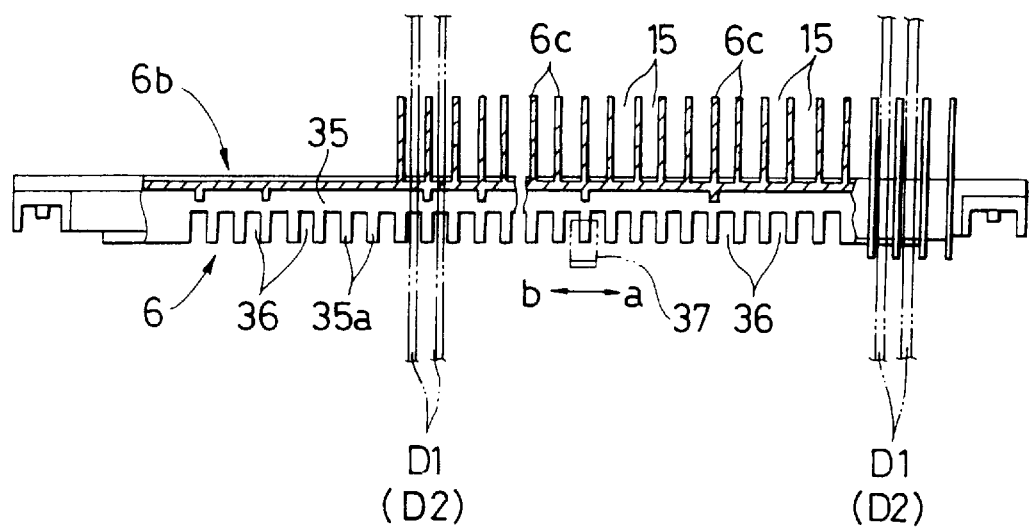
FIG. 4 is a vertical sectional view of the rear line section shown in FIG. 3.

As shown in FIGS. 3 and 4, an intermediate plate 35 is extended downwardly from the central portion of the lower surface of the rear line section 6b. The intermediate plate 35 has a number of slits 36 formed at predetermined intervals in such a manner that they are arranged horizontally (in the directions of the arrows a and b), thus forming teeth 35a. On the other hand, a photo-detector 37 comprising a light emitting unit and a light receiving unit arranged on both sides of the intermediate plate 35, is arranged on the carriage 7. When the carriage 7 is reciprocated horizontally (in the directions of the arrows a and b), the output light beam of the light emitting unit is intercepted by the teeth 35a, thus producing pulse signals. The pulse signals thus produced are counted, to detect the position of the carriage 7.

Figure 5:
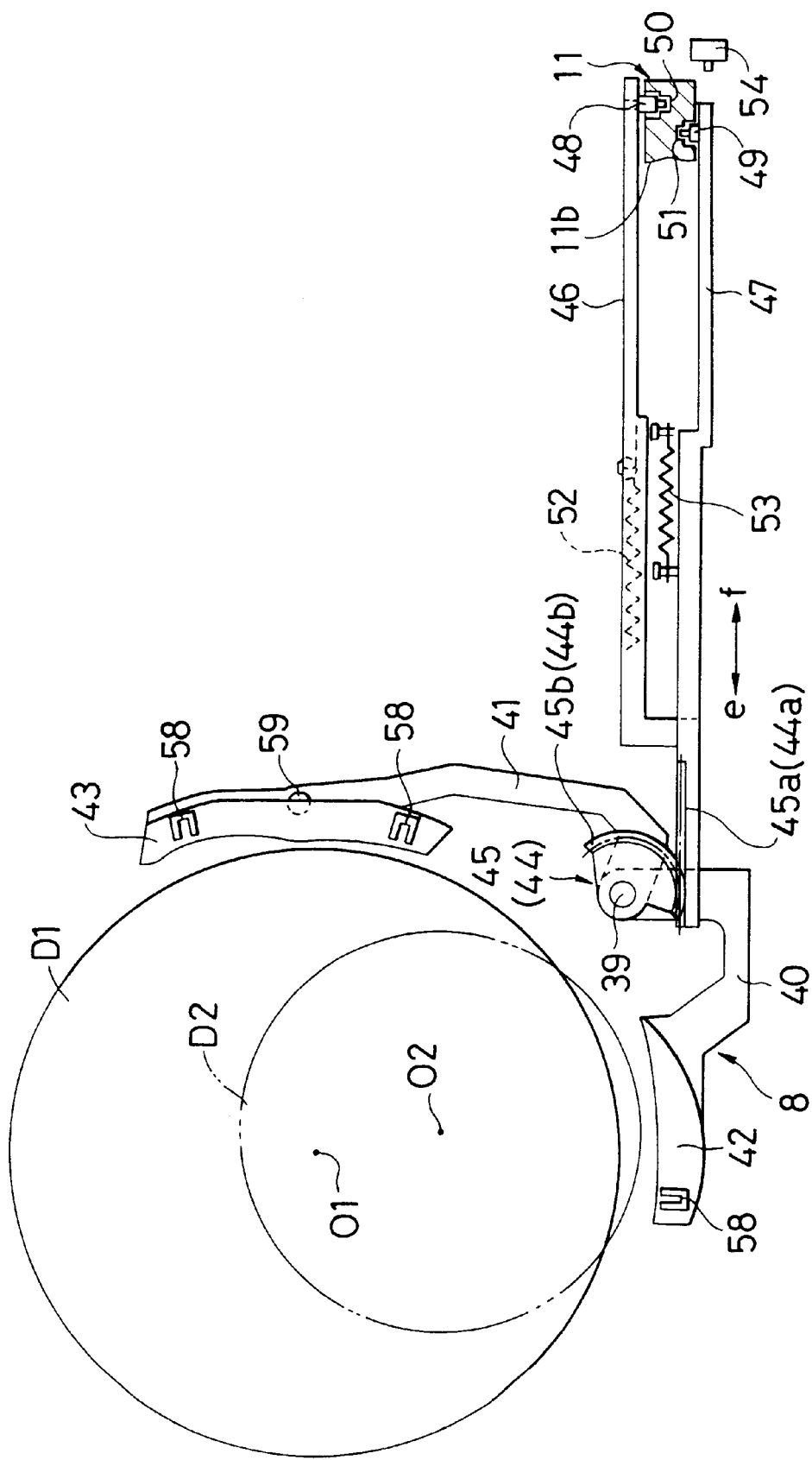
FIG. 5 is a side view showing a loading mechanism in the automatic disk changer which is going to load a disk.
Figure 6:
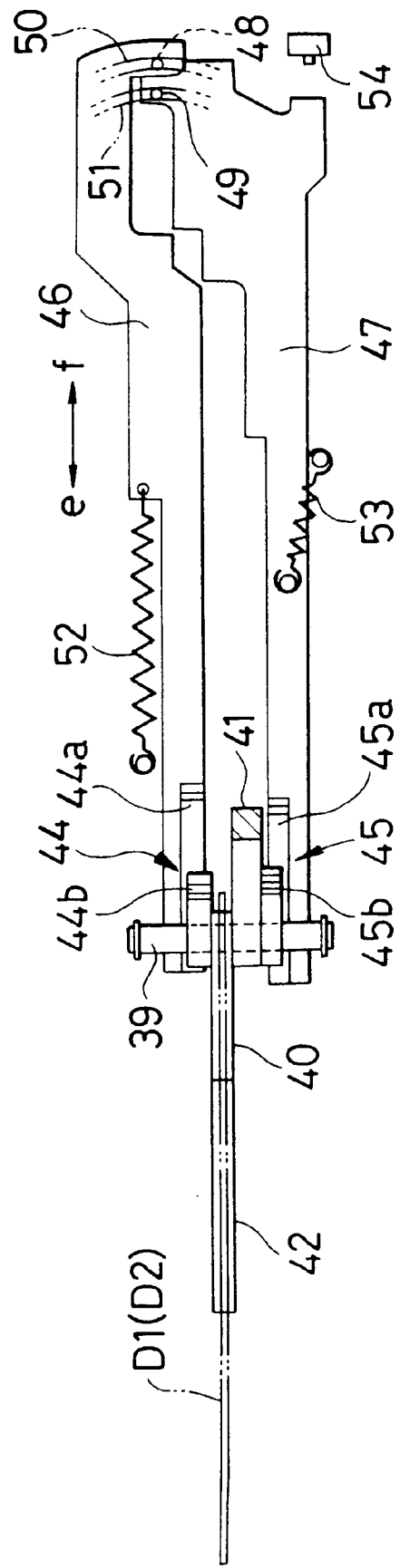
FIG. 6 is a plan view of the loading mechanism shown in FIG. 5.

The aforementioned loading mechanism 8, as shown in FIGS. 5 and 6, comprises: disk clamping arms 40 and 41 whose base end portions are swingably coupled through a supporting shaft 39 to the carriage 7 so that the disk clamping arms 40 and 41 are swingably opened about 90°; disk locking frames 42 and 43 which are swingably coupled to the end portions of those arms 40 and 41, respectively; and a pair of coupling bars 46 and 47 which are supported in such a manner that they are movable horizontally (in the directions of the arrows e and f), and which are coupled through gear mechanisms 44 and 45 to the base end portions of the arms 40 and 41, respectively. The coupling bars 46 and 47 have cam pins 48 and 49 at the rear ends, respectively. The cam pins 48 and 49 are engaged with loading cam grooves 50 and 51 which are formed in the upper and lower surfaces of the lower cam unit 11b, respectively. An energizing spring 52 is coupled to the coupling bar 46 on the side of the front arm 40 to urge the coupling bar 46 forwardly, while an energizing spring 53 is coupled to the coupling bar 47 on the side of the rear arm 41 to urge the coupling bar 47 backwardly. Further, a disk presence/absence detector 54 made up of a limit switch or the like is provided confronted with the rear end of the coupling bard 47.

Figure 7:
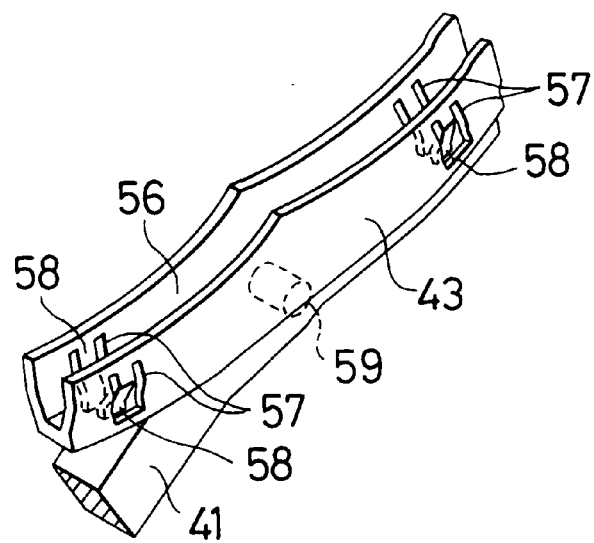
FIG. 7 is a perspective view of a rear disk locking frame in the loading mechanism.
Figure 8:
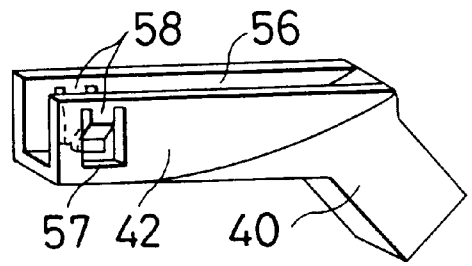
FIG. 8 is a perspective view of a front disk locking frame in the loading mechanism.
Figure 9:
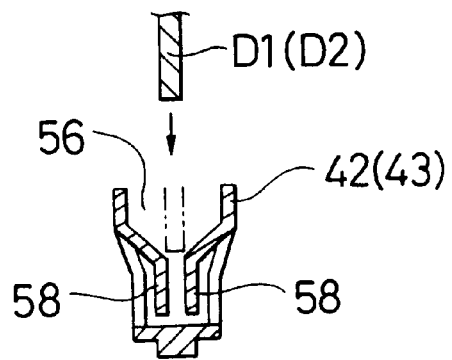
FIG. 9 is a horizontal sectional view of a disk locking frame in the loading mechanism.

The above-described disk locking frames 42 and 43 are substantially U-shaped in cross section as shown in FIGS. 7 through 9. In each of the frames 42 and 43, a disk inserting groove 56 is formed in the surface which is confronted with the disks. In both side walls of the front disk locking frame 42 and in both side walls of the rear disk locking frame 43, substantially U-shaped slits are cut to form pairs of tongue-shaped disk locking pieces 58. The end portions of the disk locking pieces 58 are inserted into the disk inserting groove 56, so that the end portions of the disk locking pieces 58 elastically clamp the peripheral portion of a disk D1 or D2 from both sides which has been inserted into the grooves 56. The length of the front disk locking frame 42 is smaller than the distance between the front and rear line sections 6a and 6b of the disk arranging stand 6, and the width of the frame 42 is smaller than the distance between the guide plates 6c and 6c of the disk arranging stand 6, so that the front disk locking frame 42 is allowed to pass through a rectangular gap which is defined by the front and rear line sections 6a and 6b and by the guide plates 6c and 6c.

The disk changer is designed as described above. Hence, when a disk D1 or D2 is clamped with the pair of disk clamping arms 40 and 41 of the loading mechanism 8, the periphery of the disk D1 or D2 is inserted into the disk locking frames 42 and 43 of the arms 40 and 41, so that the periphery of the disk D1 or D2 is elastically locked by the pairs of disk locking pieces 58 of the disk locking frames 42 and 43. Hence, the disk D1 or D2 can be delivered to the disk mounting mechanism 10 while being held vertical. The disk locking frame 42 is integral with its own disk locking pieces 58, and the disk locking frame 43 is also integral with its own disk locking pieces 58, contributing to a reduction in the number of components, and accordingly to a decrease in manufacturing cost.

As shown in FIGS. 5 and 7, a guide roller 59 is provided at the middle of the groove 56 of the rear disk locking frame 43.

Figure 13:
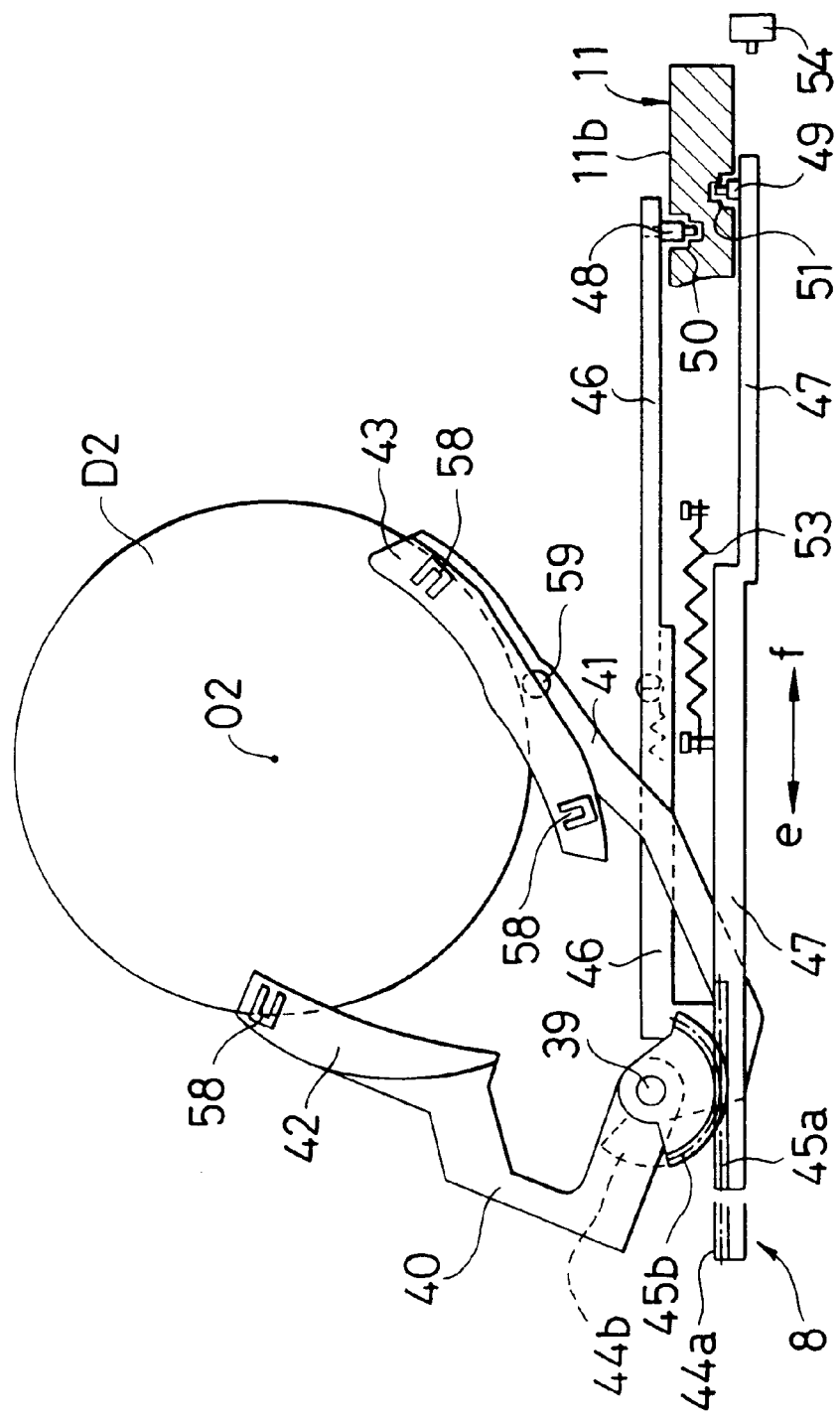
FIG. 13 is a side view of the loading mechanism which is loading a small-diameter disk.

Let us consider the case where, in the disk changer thus constructed, the large-diameter disk D1 and the small-diameter disk D2 are clamped with the disk locking frames 42 and 43 of the pair of disk clamping arms 40 and 41 one at a time. The two disks D1 and D2 are different in diameter from each other, as was described above. Hence, with the large-diameter disk D1 as a reference, the center O2 of the small-diameter disk D2 thus clamped is shifted from the center O1 of the large-diameter disk D1 thus clamped, and therefore it is impossible to mount the small-diameter disk D2 on the player body 9. However, it should be noted that the guide roller 59 is provided at the middle of the disk inserting groove 56 of the disk locking frame 43. Hence, when the small-diameter disk D2 is clamped with the disk locking frame 42 and 43 of the two arms 40 and 41, the small-diameter disk D2 is pushed upwardly by the guide roller 59, so that the center O2 of the small-diameter disk D2 is moved by the arms 40 and 41 to the center O1 of the large-diameter disk D1 held by the two locking frames 42 and 43. Therefore, similarly as in the case of the large-diameter disk D1, the small-diameter disk D2 can be delivered to the disk mounting mechanism 10; that is, it can be similarly mounted on the player body 9 (cf. FIG. 13).

The aforementioned gear mechanisms 44 and 45, as shown in FIGS. 5 and 6, comprise: racks 44a and 45a formed in the front end portions of the upper surfaces of the coupling bars 46 and 47; and sector-shaped pinions 44b and 45b which are engaged with the racks 44a and 45a, respectively. The pinions 44b and 45b are rotatably mounted on the aforementioned supporting shaft 39, and secured to the base end portions of the aforementioned arms 40 and 41, respectively.

With the disk changer thus constructed, in association with the push-pull operation of the pair of coupling bars 46 and 47, the pair of disk clamping arms 40 and 41 are positively swung until the angle between the two arms 40 and 41 is set to a predetermined value.

With the disk changer, the large-diameter disk D1 is loaded as follows: Before the large-diameter disk D1 is held with the loading mechanism 8, as shown in FIGS. 5 and 6, the disk locking frames 42 and 43 are held away from the large-diameter disk D1, and therefore the disk locking frames 42 and 43 will never collide with the large-diameter disk D1 when the carriage 7 is moved horizontally (in the direction of the arrow a or b).

Figure 18A:
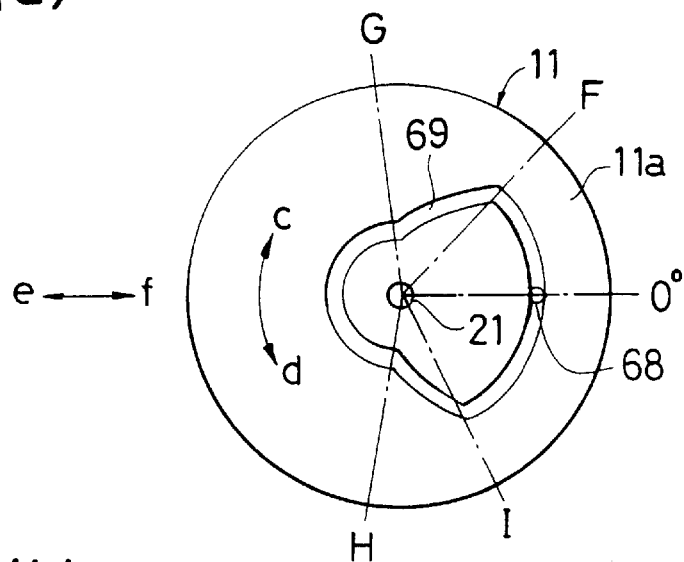
FIGS. 18(a) through 18(c) are plan views outlining a cam in the automatic disk changer.
Figure 18B:
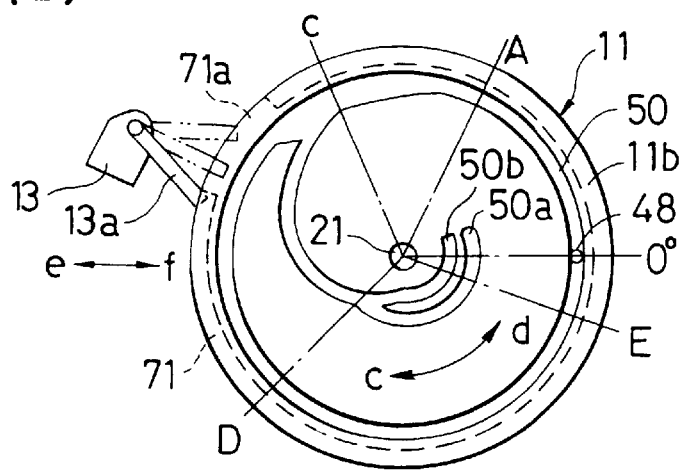
Figure 18C:
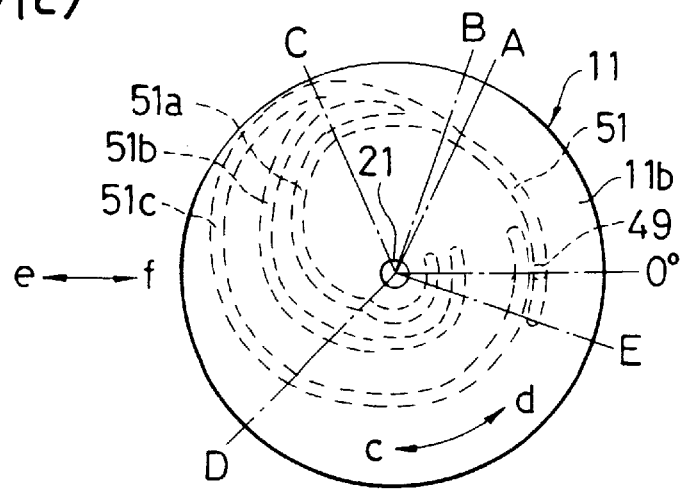
Figure 19:
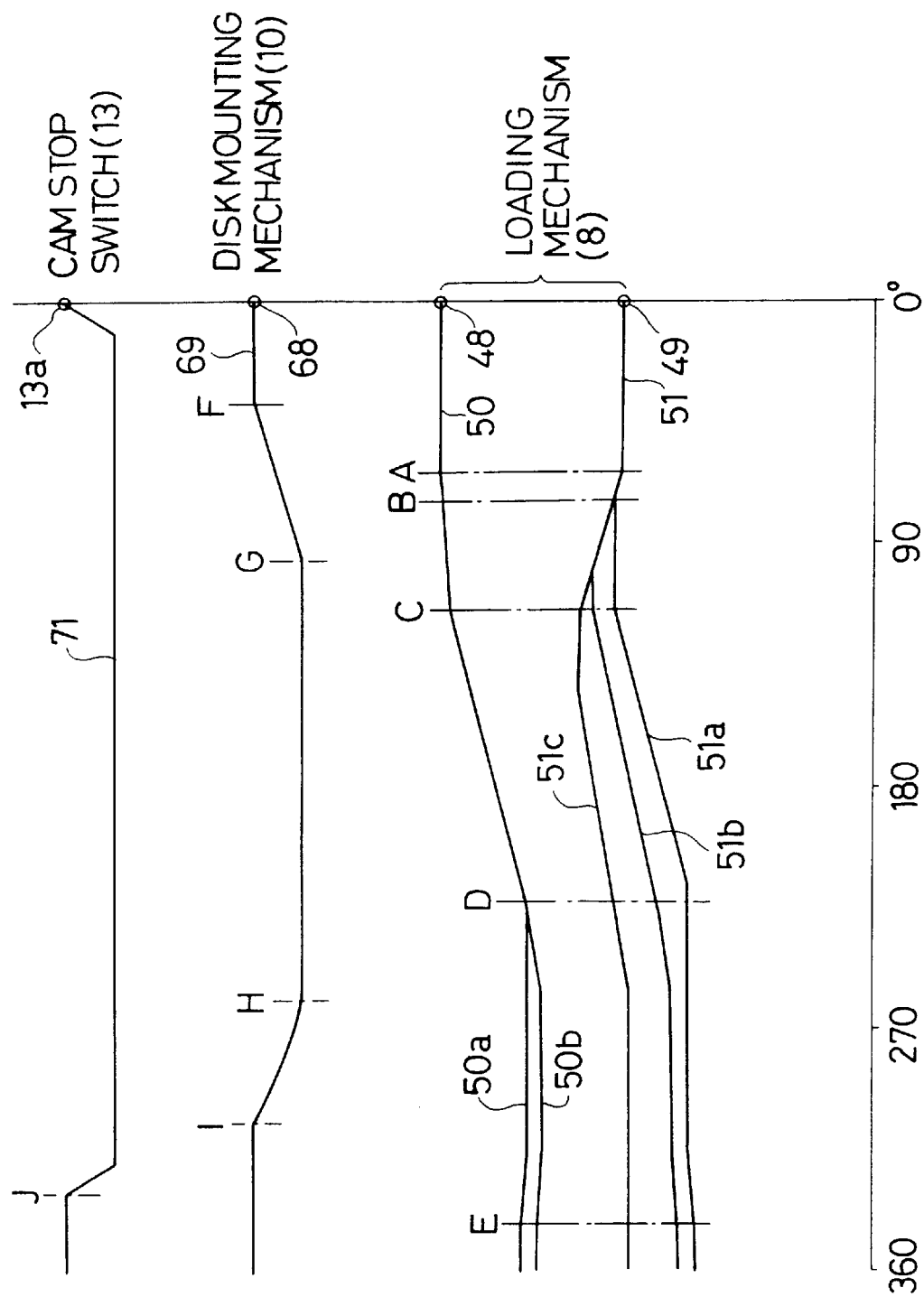
FIG. 19 is a timing chart for a description of the operation of the automatic disk changer.

Next, the carriage 7 is stopped in front of the specified large-diameter disk D1, and the cam 11 is turned in the forward direction (in the direction of the arrow c). As a result, as shown in FIGS. 18(b), 18(c) and 19, until the cam 11 reaches the position A (65°) from 0°, the cam pins 48 and 49 are not moved in the cam grooves 50 and 51 in the directions of the arrows e and f; that is, the two arms 40 and 41 are held spaced from the large-diameter disk D1 (cf. FIGS. 5 and 6).

Figure 10:
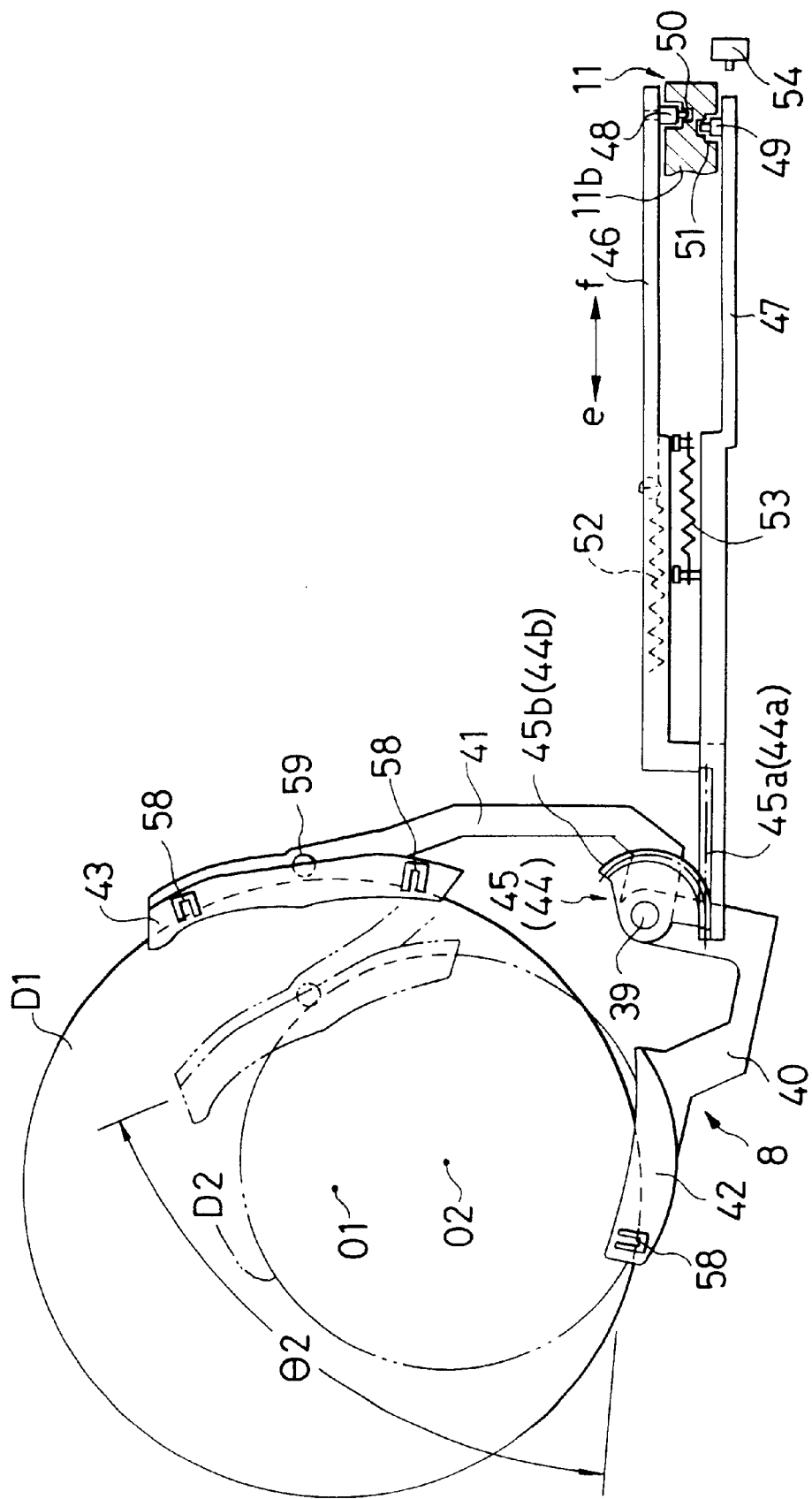
FIG. 10 is a side view showing the loading mechanism which clamps a disk.
Figure 11:
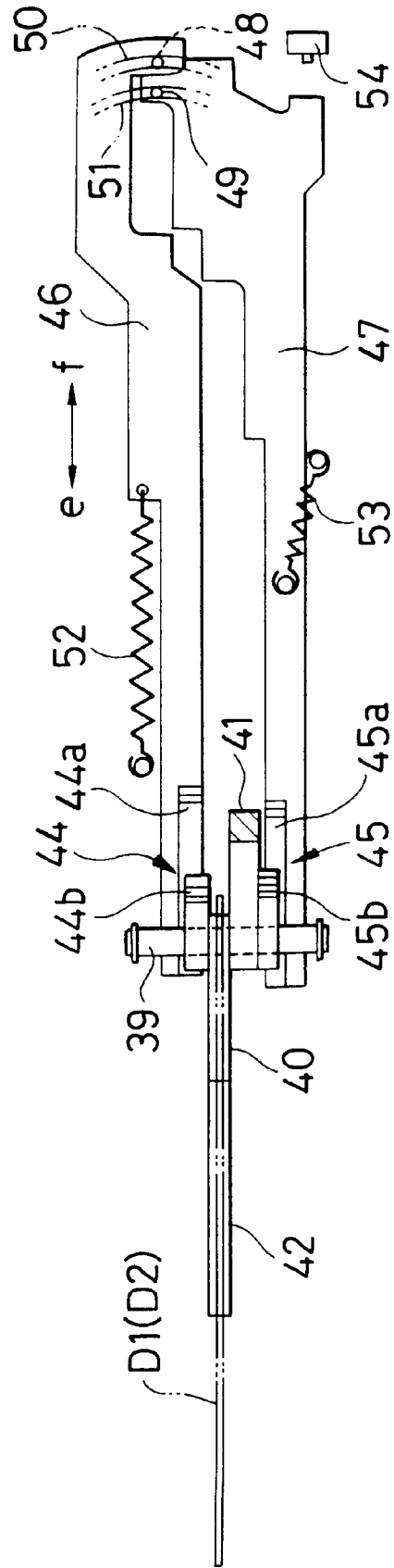
FIG. 11 is a plan view of the loading mechanism shown in FIG. 10.

Until the cam 11 reaches the position B (72°) from the position A, the cam pin 49 is retracted in the direction of the arrow f, so that the rear arm 41 is swung forwardly to abut against the large-diameter disk D1; and until the cam 11 reaches the position C (115°) from the position B, the cam pin 49 goes in a large-diameter disk branch groove 51a of the cam groove 51, thus not being moved in the directions of the arrows e and f. That is, the rear arm 41 is held abutted against the large-diameter disk D1 (cf. the solid lines in FIG. 10, and FIG. 11).

Until the cam 11 reaches the position C (115°) from the position A, the cam pin 48 is moved forwardly in the direction of the arrow e, so that the front arm 40 is swung backwardly to abut against the large-diameter disk D1. Thus, the large-diameter disk D1 is clamped by the two arms 40 and 41 (cf. the solid lines in FIG. 10, and FIG. 11).

Figure 12:
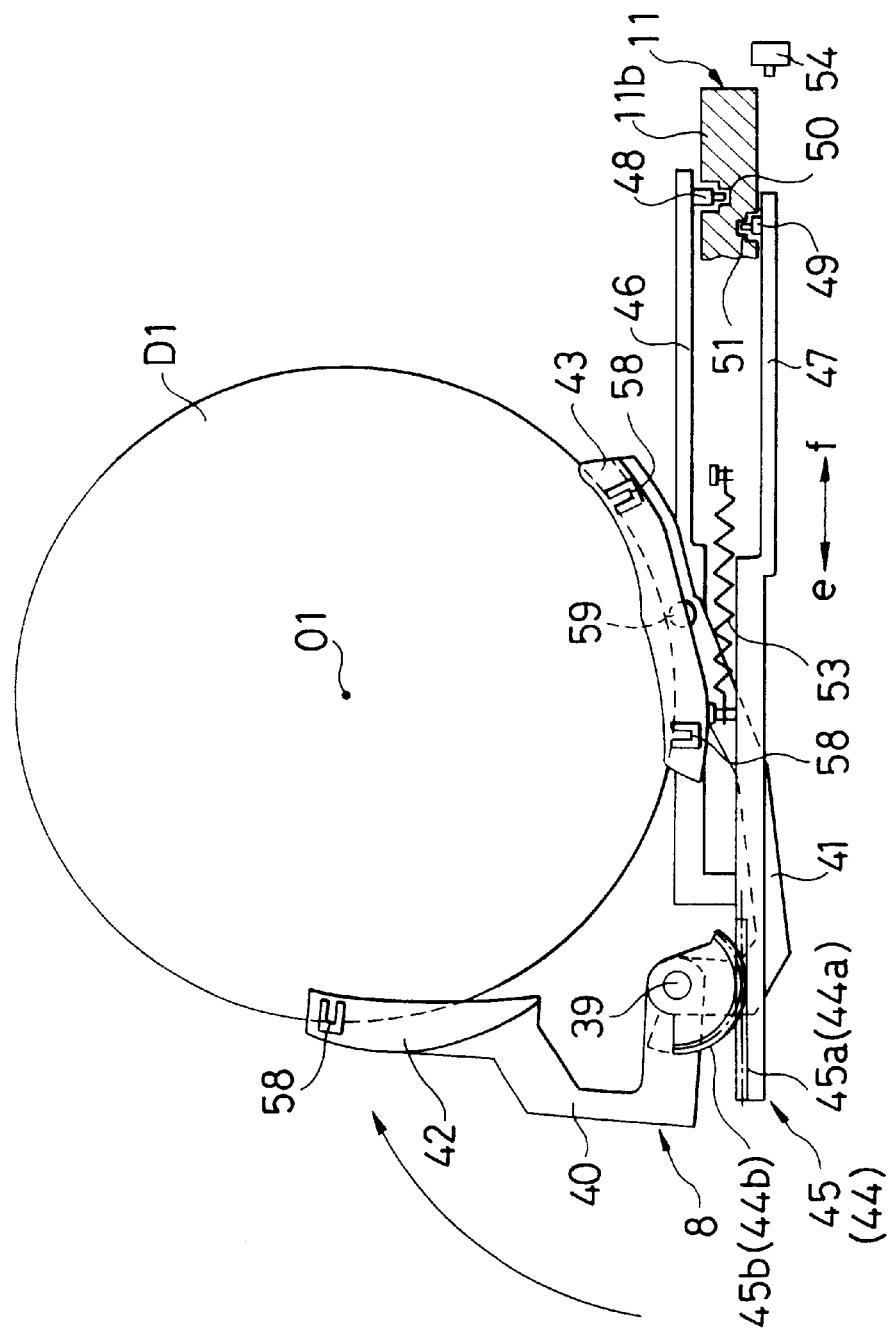
FIG. 12 is a side view of the loading mechanism which is loading a large-diameter disk.

Until the cam 11 reaches the position D (225°) from the position C, the cam pins 48 and 49 are moved forwardly in the direction of the arrow e, so that the two arms 40 and 41 clamping the large-diameter disk D1 are swung backwardly, thus inserting the large-diameter disk D1 into the disk mounting mechanism 10 (cf. FIG. 12).

Until the cam 11 reaches the position E (340°) from the position D, the cam pin 48 is moved into the large-diameter disk branch groove 50a, thus being moved backwardly in the direction of the arrow f. As a result, the cam pin 49 is moved forwardly in the direction of the arrow e. Hence, the two arms 40 and 41 are moved away from the large-diameter disk D1, so that the disk D1 is handed to the disk mounting mechanism 10.

The small-diameter disk loading procedure is substantially equal to the above-described large-diameter disk loading procedure; however, the former is different from the latter in the following points: That is, the cam pin 49 is moved in the small-diameter disk branch groove 51b of the cam groove 51, so that the rear arm 41 is more forwardly swung than in the case of the large-diameter disk D1, thus being abutted against the small-diameter disk D2. Thus, the small-diameter disk D2 is clamped by the two arms 40 and 41 (cf. the phantom lines in FIG. 10). As the cam pin 48 is moved in the small-diameter disk branch groove 50b of the cam groove 50, so that the front arm 40 is more backwardly swung than in the case of the large-diameter disk D1, and the small-diameter disk D2 is clamped by the two arms 40 and 41. In this case, the small-diameter disk D2 is pushed up by the guide roller 59, so that the center O2 of the small-diameter disk D2 is moved to the center O1 of the large-diameter disk D1 clamped by the arms 40 and 41 (the disks D1 and D2 becoming coaxial with each other). Hence, similarly as in the case of the large diameter disk D1, the small-diameter disk D2 is handed to the disk mounting mechanism 10, thus being mounted on the player body 9 (cf. FIG. 13).

In the case where the specified disk D1 or D2 is not present, and accordingly it is impossible for the arms 40 and 41 to clamp the specified disk, the cam pin 49 is moved in the outer branch groove 51c of the cam groove 51. As a result, the rear arm 41 is more forwardly swung than in the case of the small-diameter disk D2. As a result, the angle 61 formed between the two arms 40 and 41 is smaller than that 62 formed when the small-diameter disk D2 is clamped (cf. FIG. 14), and accordingly the coupling bar 47 is moved backwardly in the direction of the arrow f, thus striking against the disk presence/absence detector 54, to detect the fact that the disk D1 or D2 is not present. In response to the detection, the disk delivering operation can be stopped immediately; that is, loss time can be shortened as much.

Figure 15:
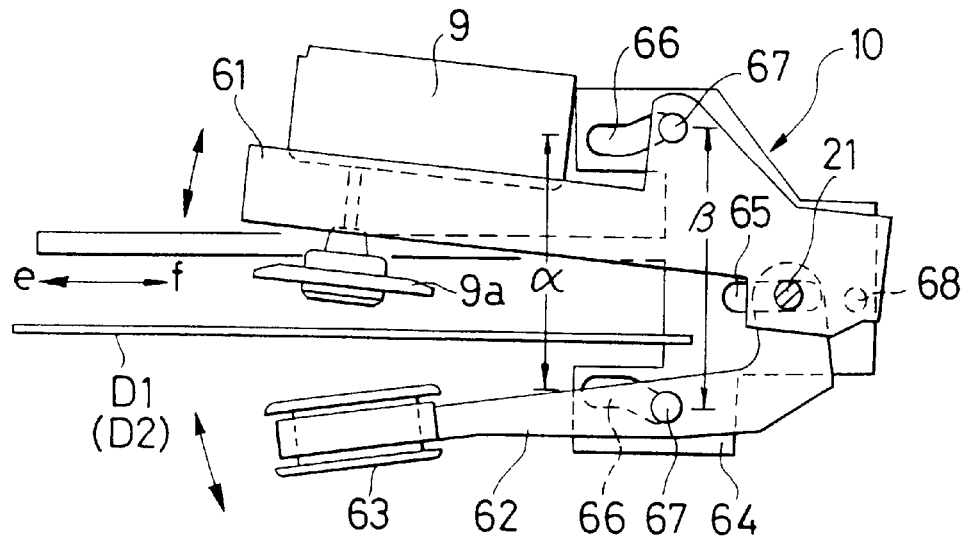
FIG. 15 is a plan view showing a disk mounting mechanism in the automatic disk changer which is going to mount a disk.
Figure 16:
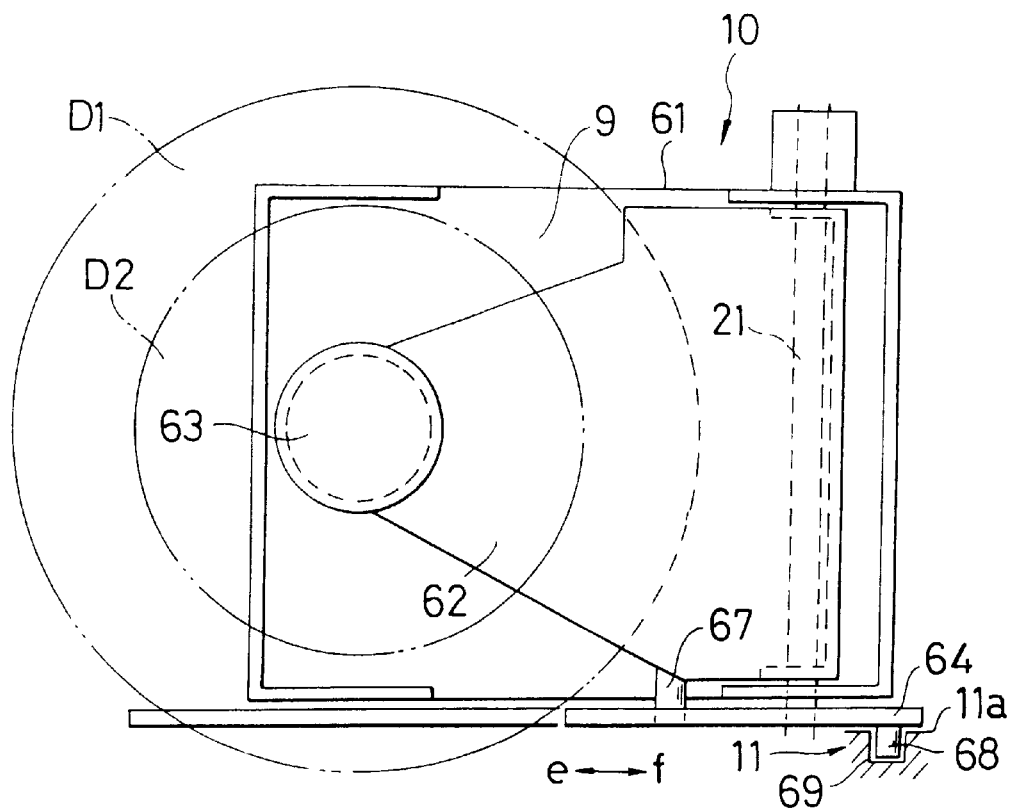
FIG. 16 is a side view of the disk mounting mechanism shown in FIG. 15.

The aforementioned disk mounting mechanism 10, as shown in FIGS. 15 and 16, comprises a pair of swing frames 61 and 62 which are swingable about the supporting shaft 21. The player body 9 including a turn table 9a and an optical pickup is provided on one of the swing frames 61 and 62 (the swing frame 61 in the case of the embodiment), and a disk retaining member 63 is provided on the other swing frame 62 which is detachably engageable with the turn table 9a. An operating board 64 is provided below the swing frames 61 and 62 in such a manner that it is movable horizontally (in the directions of the arrows e or f), and an elongated hole 65 is formed in the middle of the operating board 64. The supporting shaft 21 is extended through the elongated hole 65 thus formed. The operating board 64 is fork-shaped, and has two-step bent holes 66 and 66 in its two prongs. Those bent holes 66 and 66 are engaged with engaging pins 67 and 67 protruded from the swing frames 61 and 62, respectively. A cam pin 68 is protruded from the base end portion of the fork-shaped operating board 64, and is fitted in a cam groove 69 formed in the upper surface of the upper cam unit 11a. The distance α between the front end portions of the bent holes 66 and 66 is smaller than the distance β between the rear end portions of the holes 66 and 66 (α<β).

Figure 17:
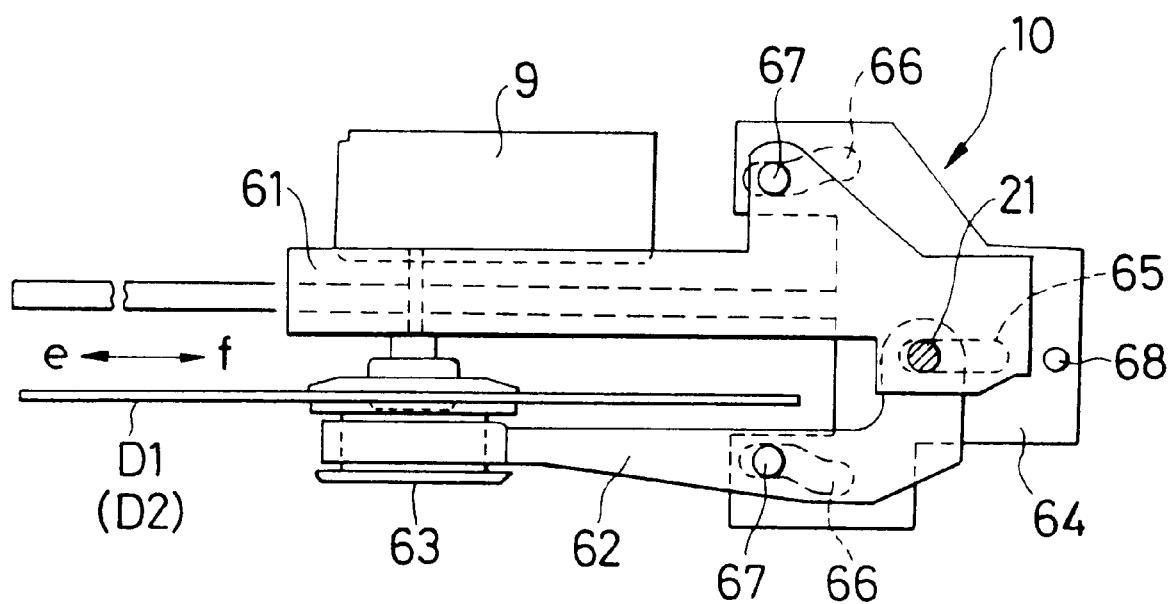
FIG. 17 is a plan view of the disk mounting mechanism which is mounting a disk.

Before the operation of the disk mounting mechanism 10, the swing frames 61 and 62 are held closed (cf. FIG. 2). Under this condition, the cam 11 is turned forwardly (in the direction of the arrow c). When, as shown in FIG. 18(a) and FIG. 19, the cam 11 reaches the position F (45°) from the position (0°), the cam pin 68 is moved forwardly, in the direction of the arrow e, with the aid of the cam groove 69, so that the rear end portions of the bent holes 66 and 66 are engaged with the engaging pins 67 and 67, and the swing frames 61 and 62 are opened swinging about the supporting shaft 21. This state is maintained until the cam 11 reaches the position H (260°) from the position G (95°). During this period, as shown in FIG. 15, the disk D1 or D2 is inserted between the swing frames 61 and 62 by means of the loading mechanism 8. Next, by the time instant that the cam 11 reaches the position I (295°), the cam pin 68 is moved backwardly, in the direction of the arrow f, with the aid of the cam groove 69, so that the front end portions of the bent holes 66 and 66 are engaged with the engaging pins 67 and 67, and the swing frames 61 and 62 are closed swinging about the supporting shaft 21. As a result, as shown in FIG. 17, the disk D1 or D2 is clamped by the turn table 9a and the disk retaining member 63, and mounted on the player body 9.

In the embodiment, the aforementioned cam stop switch 13 is a tumbler switch as shown in FIG. 18(b). The switch 13 has a detecting lever 13a which is engaged with a protrusion 71a left in a cam groove 71 which is formed in the side surface of the lower cam unit 11b in such a manner that it covers 340°.

Let us consider the case where the cam 11 is turned in the forward direction, in the direction of the arrow c. As shown in FIG. 18(b) and FIG. 19, immediately when the cam 11 leaves the position 0°, the detecting lever 13a is placed in a neutral state. When the cam 11 reaches the position J (340°), the detecting lever 13a strikes against the protrusion 71a, so that the cam stop switch 13 is activated to output a detection signal. In response to the detection signal, the rotation of the cam 11 is stopped. On the other hand, let us consider the case where the cam 11 is turned from the position J in the reverse direction (in the direction of the arrow d). When the cam reaches the zero position (0°), the detecting lever 13a strikes against the protrusion 71a, so that the cam stop switch 13 is activated to output a detection signal. In response to the detection signal, the rotation of the cam 11 is stopped.

As was described above, the loading mechanism 8, the disk mounting mechanism 10, and the cam stop switch 13 can be operated with only one cam 11. Hence, the resultant disk changer is simple in structure, and low in manufacturing cost.

Figure 20:
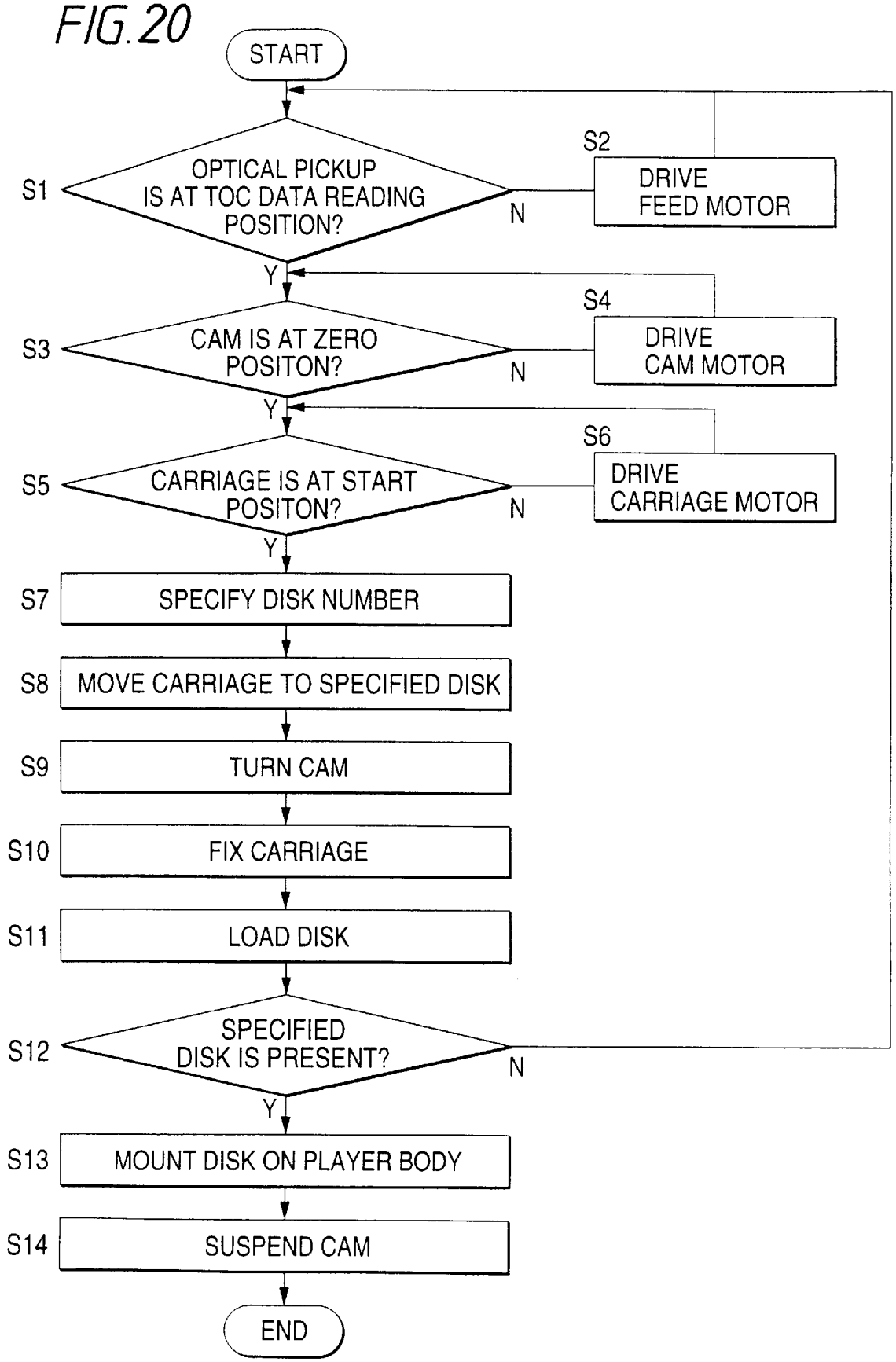
FIG. 20 is a flow chart for a description of the operation of the automatic disk changer.

The above-described loading mechanism 8 and disk mounting mechanism 10 are controlled by a control unit (not shown) comprising a microcomputer. The functions of the control unit will be described with reference to FIG. 20.

When a power switch 5a is depressed, the player body 9 is operated, and it is determined whether or not the optical pickup of the player body 9 is at a TOC data reading position for a disk D1 or D2 (Step S1). If the optical pickup is shifted from the TOC data reading position, a feed motor is driven to move the optical pickup to the TOC data reading position (Step S2). Next, it is determined whether or not the cam 11 is at the zero position (0°) (Step S3). If the cam 11 is shifted therefrom, the cam motor 30 is driven so that the cam 11 is at the zero position (Step S4). Thereafter, it is determined whether or not the carriage 7 is at the start position (Step S5). If not, the carriage motor 27 is driven so that the carriage 7 is at the start position (Step S6). Next, a desired disk D1 or D2 is selected among a number of disks D1 and D2 on the disk arranging stand 6. In response to the selection of the disk, the disk specifying switch 5b is operated to specify the disk number (Step S7); that is, to output a specifying signal. In response to the specifying signal, the control unit drives the carriage motor 27 so that the carriage 7 is moved to the disk D1 or D2 thus specified (Step SB). As a result, as shown in FIGS. 5 and 6, the disk clamping arms 40 and 41 of the loading mechanism 8 are confronted through the specified disk D1 or D2 with each other.

Under this condition, the cam 11 is turned in the forward direction (in the direction of the arrow c) (Step S9), so that the disk mounting mechanism 10, the loading mechanism 8, and the cam stop switch 13 are operated one after another according to a timing chart shown in FIG. 19. This will be described in more detail. After the carriage 7 is fixed (Step S10), the disk D1 or D2 is loaded (Step S11). More specifically, the swing frames 61 and 62 are opened with the aid of the cam pin 68 and the cam groove 69 in the disk mounting mechanism 10, and the disk D1 or D2 clamped by the arms 40 and 41 is inserted between the swing arms 61 and 62 (cf. FIGS. 12, 13 and 15).

Figure 14:
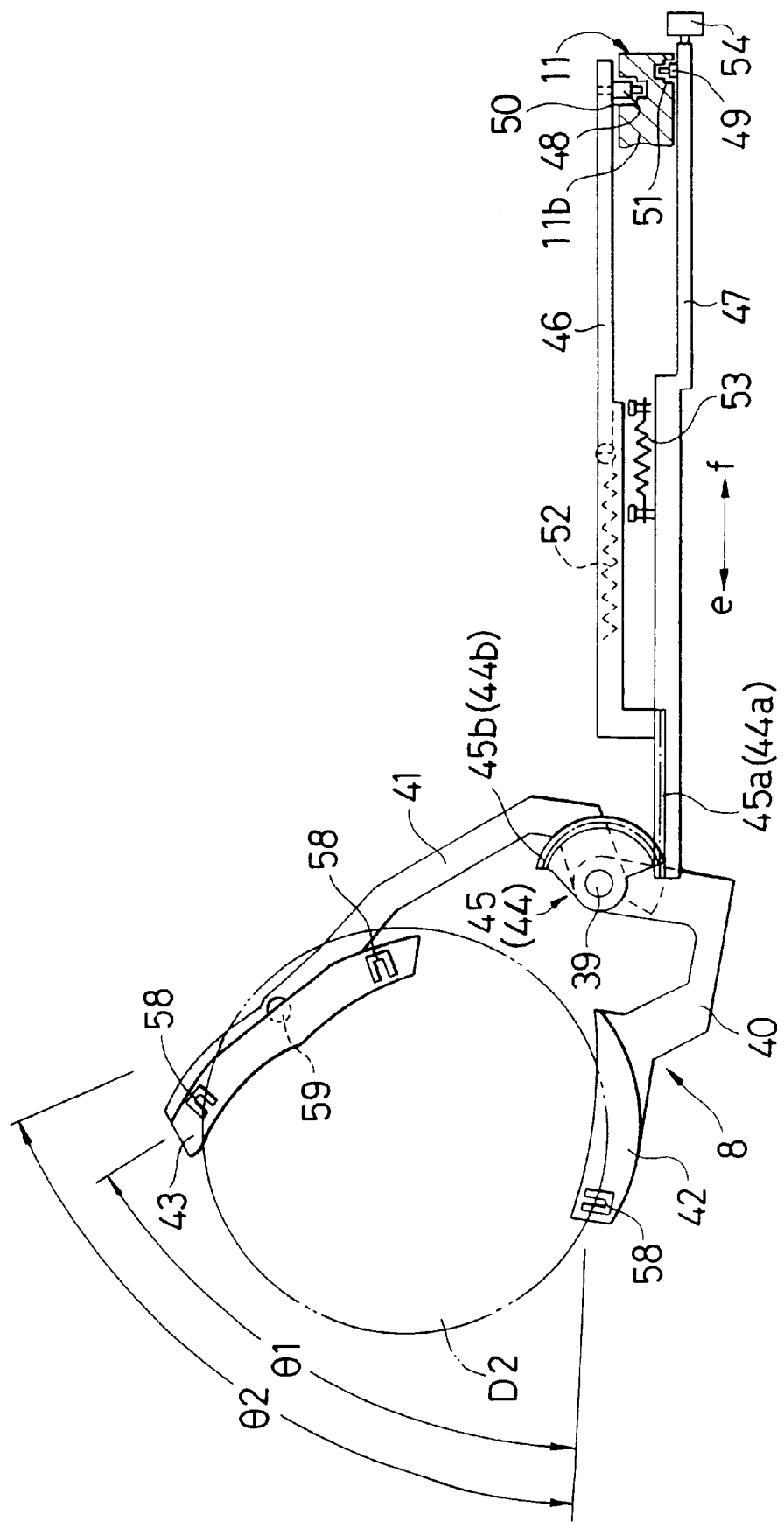
FIG. 14 is a side view for a description of the behavior of the loading mechanism in the case where the aimed disk is not present.

Next, during loading, it is determined whether or not the specified disk is present (Step S12). That is, in the case where the specified disk is not present, as shown in FIG. 14 the rear arm 41 is swung forwardly through a large angle. In response to this swing operation, the coupling bar 47 is moved backwardly in the direction of the arrow f to strike against the disk presence/absence detector 54 to activate the detector 54, so that the detector 54 outputs a detection signal. In response to the detection signal thus outputted, the above-described operations are canceled, so that the carriage 7 is returned to the original position.

When, as was described above, the disk D1 or D2 is set between the swing frames 61 and 62 of the disk mounting mechanism 10 (cf. FIG. 15), the swing frames 61 and 62 are closed, so that the disk D1 or D2 is clamped between the disk retaining member 63 and the turn table 9a, whereby the disk is mounted on the player body 9 (Step S13).

Next, the detecting lever 13a of the cam stop switch 13 is engaged with the protrusion 71a of the cam groove 71, to activate the cam stop switch 13. In response to the detection signal from the cam stop switch 13, the rotation of the cam 11 is stopped (Step S14).

Thereafter, the player body 9 is operated to reproduce data from the disk D1 or D2. After the reproduction, with the above-described operations performed in the reverse order, the disk D1 or D2 is returned to its original position on the disk arranging stand 6, and the carriage 7 is returned to the standby position.

Figure 21:
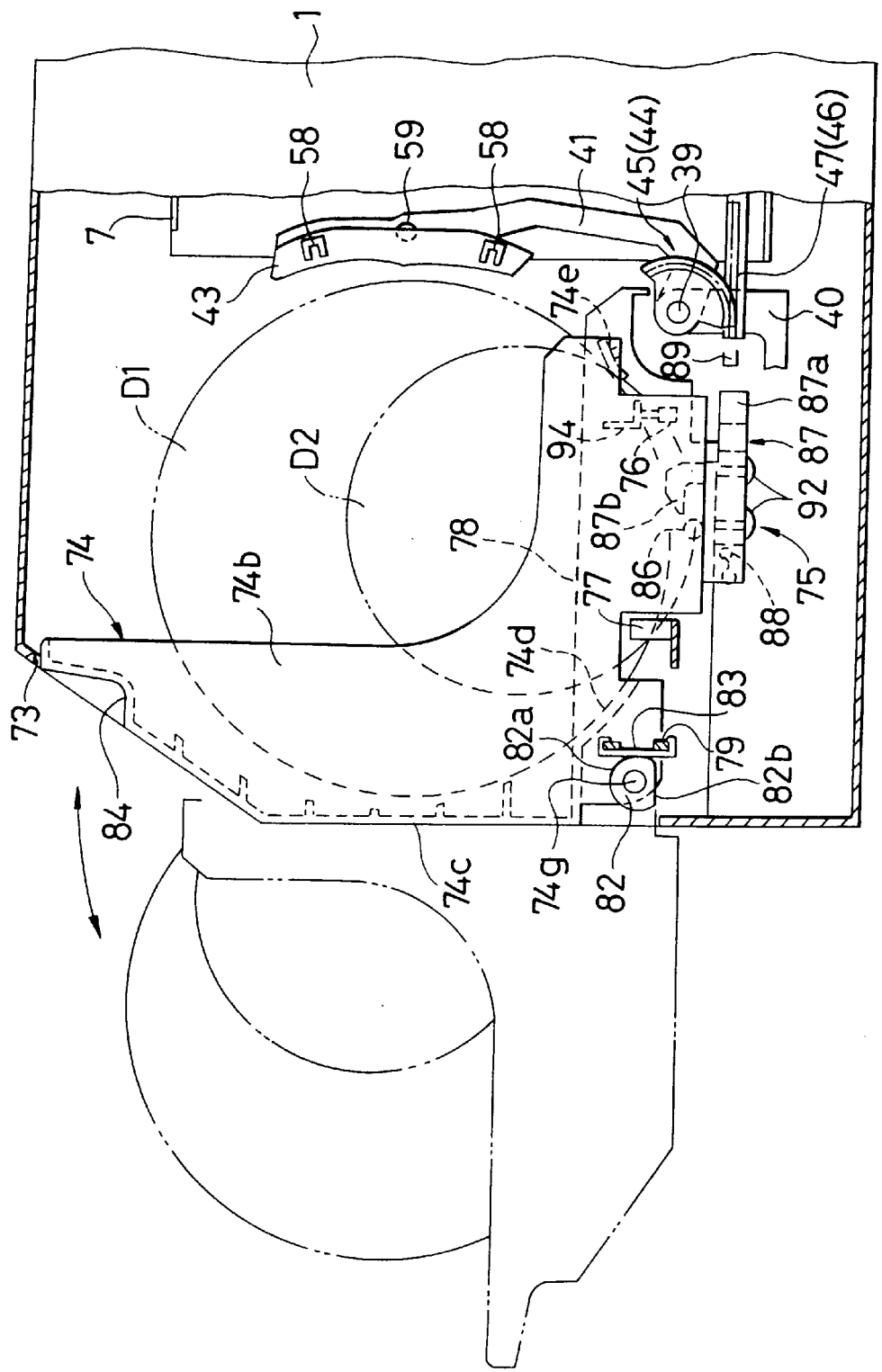
FIG. 21 is a side view, with parts cut away, showing the automatic disk changer.
Figure 22:
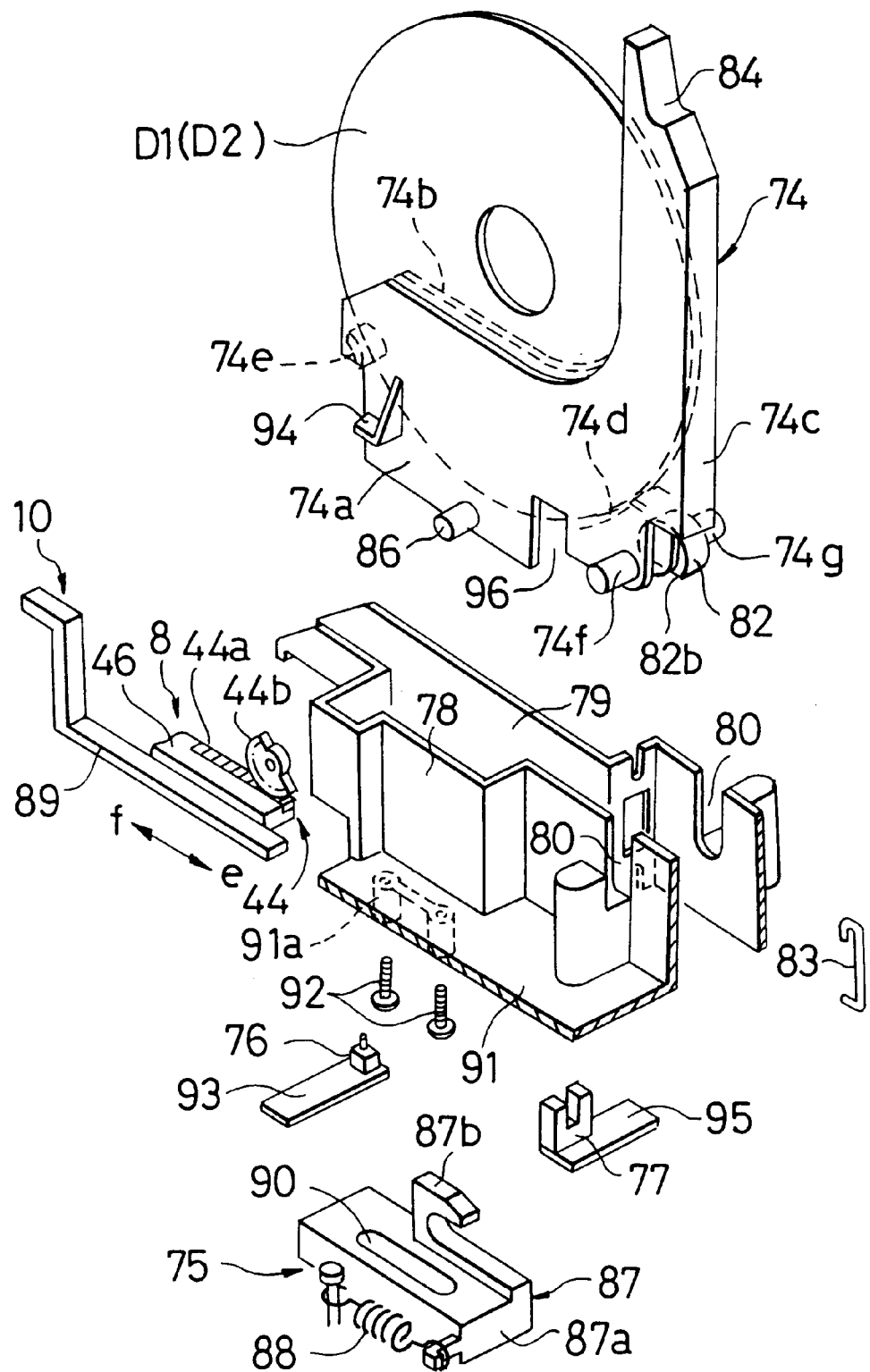
FIG. 22 is an exploded perspective view of a swing tray and its relevant components in the automatic disk changer.

As shown in FIGS. 2, 21 and 22, the aforementioned disk inserting swing tray 74 is provided confronted with the carriage 7 stopped at the standby position, and comprises: a locking mechanism which locks the swing tray 74; and a tray detector 76 and a disk detector 77 which detect the swing tray 74 and a disk D1 or D2, respectively, when the disk reaches a predetermined position in the casing 1.

The swing tray 74 is made up of a pair of right and left side plates 74a and 74b which are slightly larger in thickness than the disk D1 or D2 and are substantially L-shaped, a front plate 74c which is connected between the front edges of the side plates 74a and 74b, and a front receiving portion 74d and a rear receiving portion 74e which is connected between the lower portions of the side plates 74a and 74b with a predetermined space between them. Hence, when a disk D1 or D2 is inserted between the side board 74a and 74b, the lower edge of the disk D1 or D2 is supported by the front receiving portion 74d and the rear receiving portion 74e.

The disk locking frame 42 is passed through a rectangular-box-shaped space which is defined by the right and left side plates 74a and 74b and the front and rear receiving portions 74d and 74e, to push up the disk D1 or D2 in the swing tray 74.

Supporting shafts 74f and 74g extended outwardly from the lower ends of the front portions of the right and left side plates 74a and 74b are fitted in shaft-receiving recesses 80 and 80 which are formed in the right and left stationary side plates 78 and 79 in the casing 1, respectively, so that the swing tray 74 can be swung about the supporting shafts 74f and 74g forwardly and backwardly.

A substantially D-shaped locking cam 82 is formed on the supporting shaft 74g, and an elastic rod 83 locked to the side plate 79 is abutted against the aforementioned locking cam 82. In the case where the swing tray 74 is held inside the casing 1 as indicated by the. solid lines in FIG. 21, the arcuate surface 82a of the locking cam 82, being abutted against the elastic rod 83, prevents the swing tray 74 from unintentionally swinging forwardly. When, under this condition, the swing tray 74 is pulled forwardly with the finger set in a recess 84 formed in the upper end portion of the swing tray 74, the tray 74 is swung about the supporting shafts 74f and 74g, thus being protruded forwardly as indicated by the phantom lines in FIG. 21. As a result, the flat surface 82b of the locking cam 82 is abutted against the elastic rod 83, so that the swing tray 74 is maintained protruded.

The aforementioned locking mechanism 75, as shown in FIGS. 21 and 22, comprises: a lock pin 86 which is protruded from the middle of the lower portion of the side plate 74a; a lock body 87 which is engageable with and disengageable from the lock pin 86; and a spring 88 which urges the lock body 87 to move away from the lock pin 86.

The lock body 87 comprises: a slider 87a (rectangular in a plan view) which is confronted with the coupling bar 46 of the loading mechanism 8 and the operating bar 89 (cf. FIG. 2) extended forwardly from the operating board 64 of the disk mounting mechanism 10; and a hook 87b which is protruded from the upper surface of the slider 87a. The slider 87a has an elongated through-hole 90 at the center. The through-hole 90 is engaged with a protrusion 91a which is extended from the stationary bottom plate 91 of the casing 1. The protrusion 91a is threadably engaged with retaining bolts 92, so that the lock body is movable back and forth (in the directions of the arrows e and f) over a certain distance.

The aforementioned tray detector 76 is made up of a limit switch or the like, and is set on a supporting plate 93 inserted between the rear portions of stationary side plates 78 and 79, and a retaining member 94 is mounted on the side plate 74a of the swing tray 74 in such a manner that it is confronted with the tray detector 76. On the other hand, the disk detector 77 is made up of a photo-detector comprising a light emitting unit and a light receiving unit, and it is mounted on a supporting plate 95 which is inserted between the front portions of the side plates 78 and 79. In order to prevent the side plates 74a and 74b of the swing tray 74 from colliding with the disk detector 77, the side plates 74a and 74b have cuts (or recesses) 96.

In the case where it is required to play a particular disk D1 or D2, for instance, a newly purchased disk immediately, the disk changer is operated as follows: As indicated by the phantom lines in FIG. 21 and in FIG. 23(*a*), the swing tray 74 is pulled out of the casing 1, and the disk is set in the swing tray 74, and then the tray 74 is pushed backwardly.

Figure 23A:
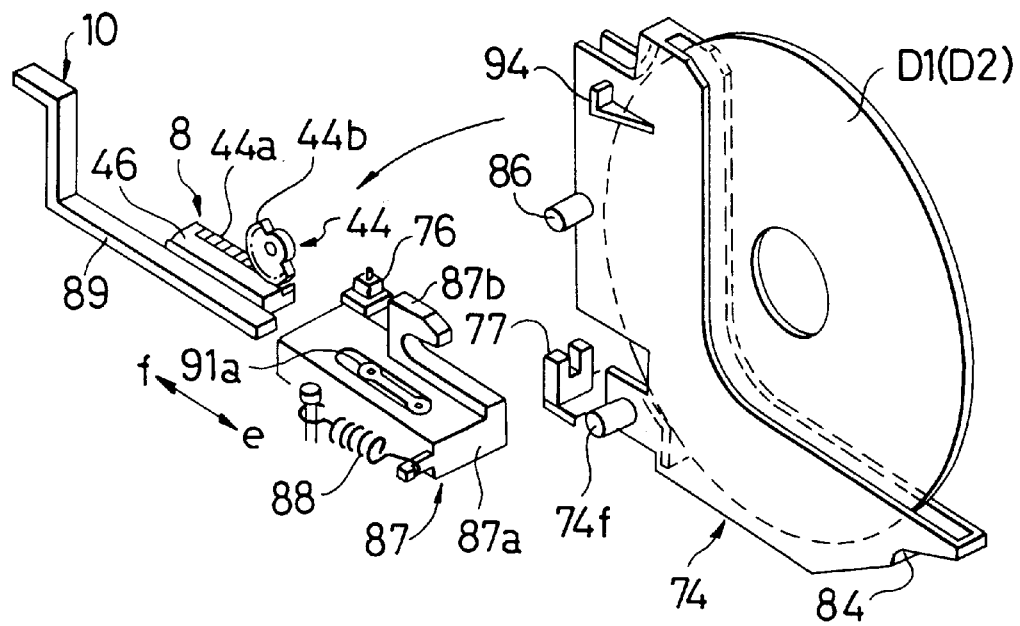
FIGS. 23(a) and 23(b) are perspective views for a description of the front half of a procedure of mounting a disk inside the casing with aid of the swing tray.
Figure 23B:
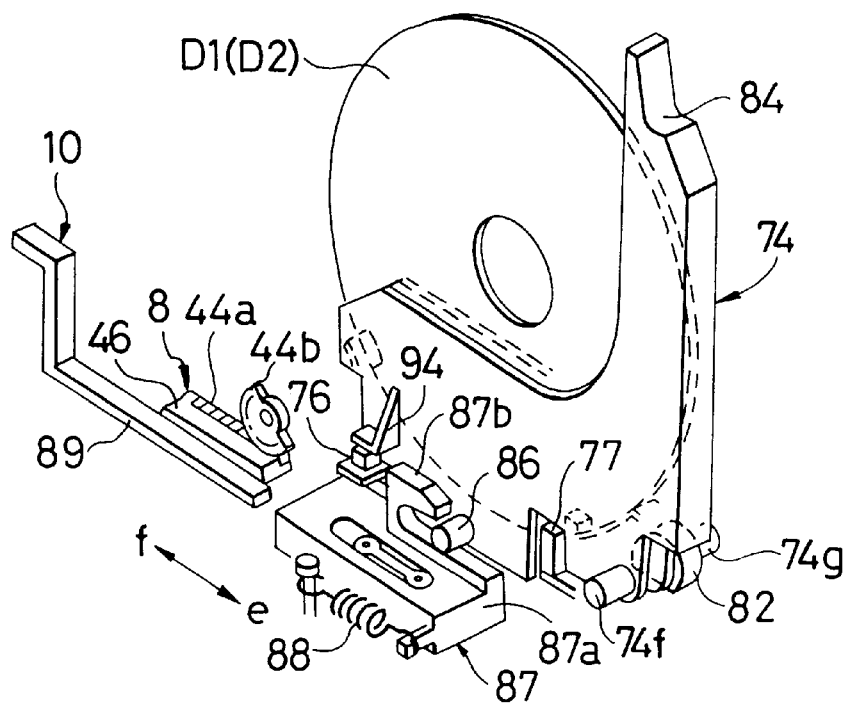

As a result, as shown in the solid lines in FIG. 21 and in FIG. 23(*b*), the swing tray 74 is swung about the supporting shafts 74f and 74g backwardly, whereby the disk D1 or D2 is inserted into the casing 1. In this case, the retaining member 94 abuts against the tray detector 76, so that it is detected that the swing tray 74 has been set in the casing 1 in the predetermined manner. At the same time, the light beam applied from the light emitting unit to the light receiving unit of the disk detector 77 is intercepted by the disk D1 or D2 in the swing tray 74, so that it is detected that the disk D1 or D2 is set at the predetermined position in the casing 1 with the aid of the swing tray 74.

Figure 24A:
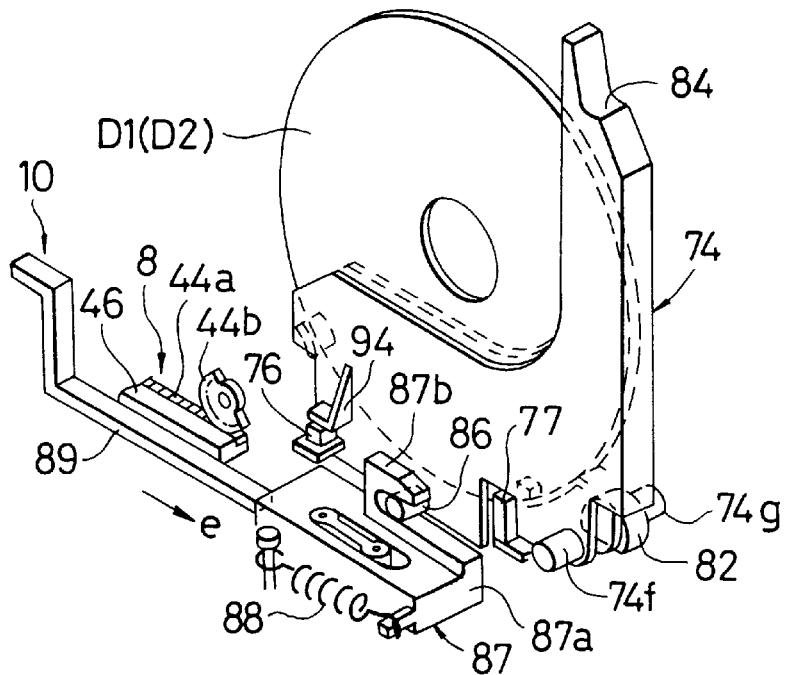
FIGS. 24(a) and 24(b) are perspective views for a description of the rear half of the procedure of mounting a disk inside the casing with aid of the swing tray.
Figure 24B:
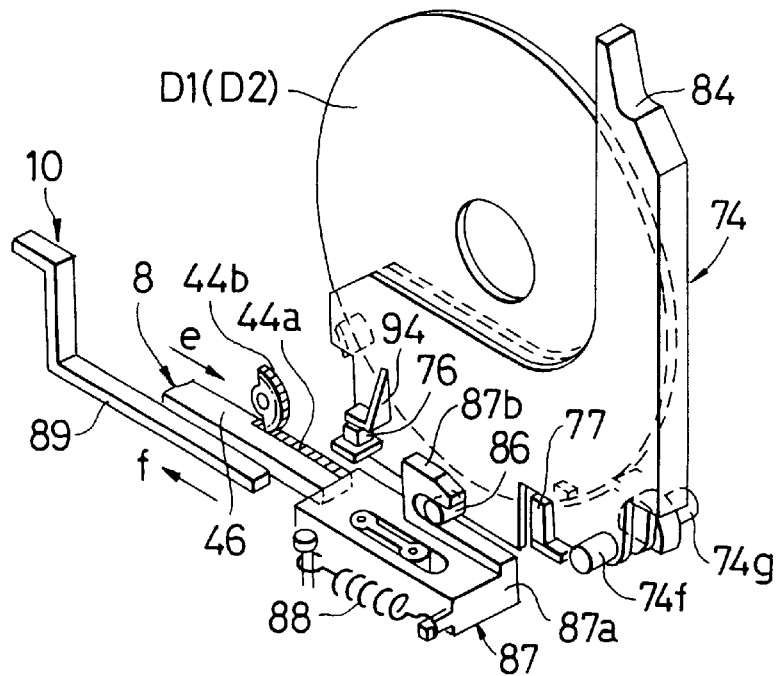
Figure 27:
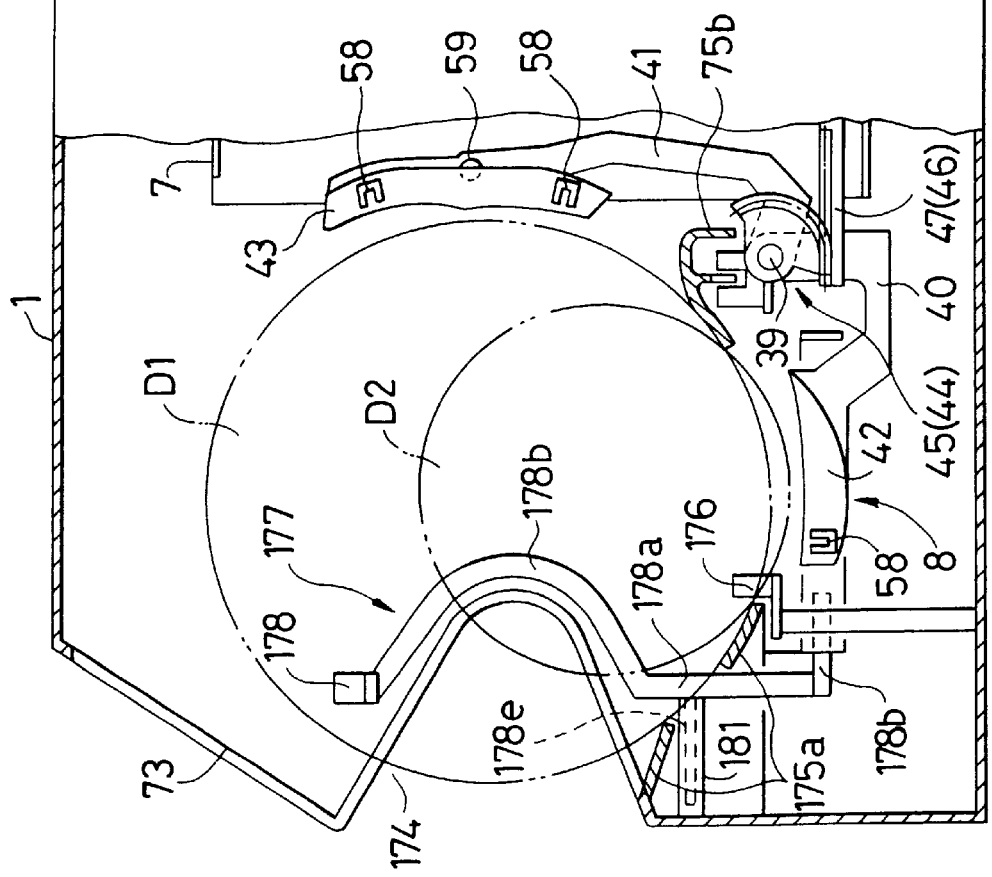
FIG. 27 is a side view, with part cut away, showing the automatic disk changer of the second embodiment.
Figure 28:
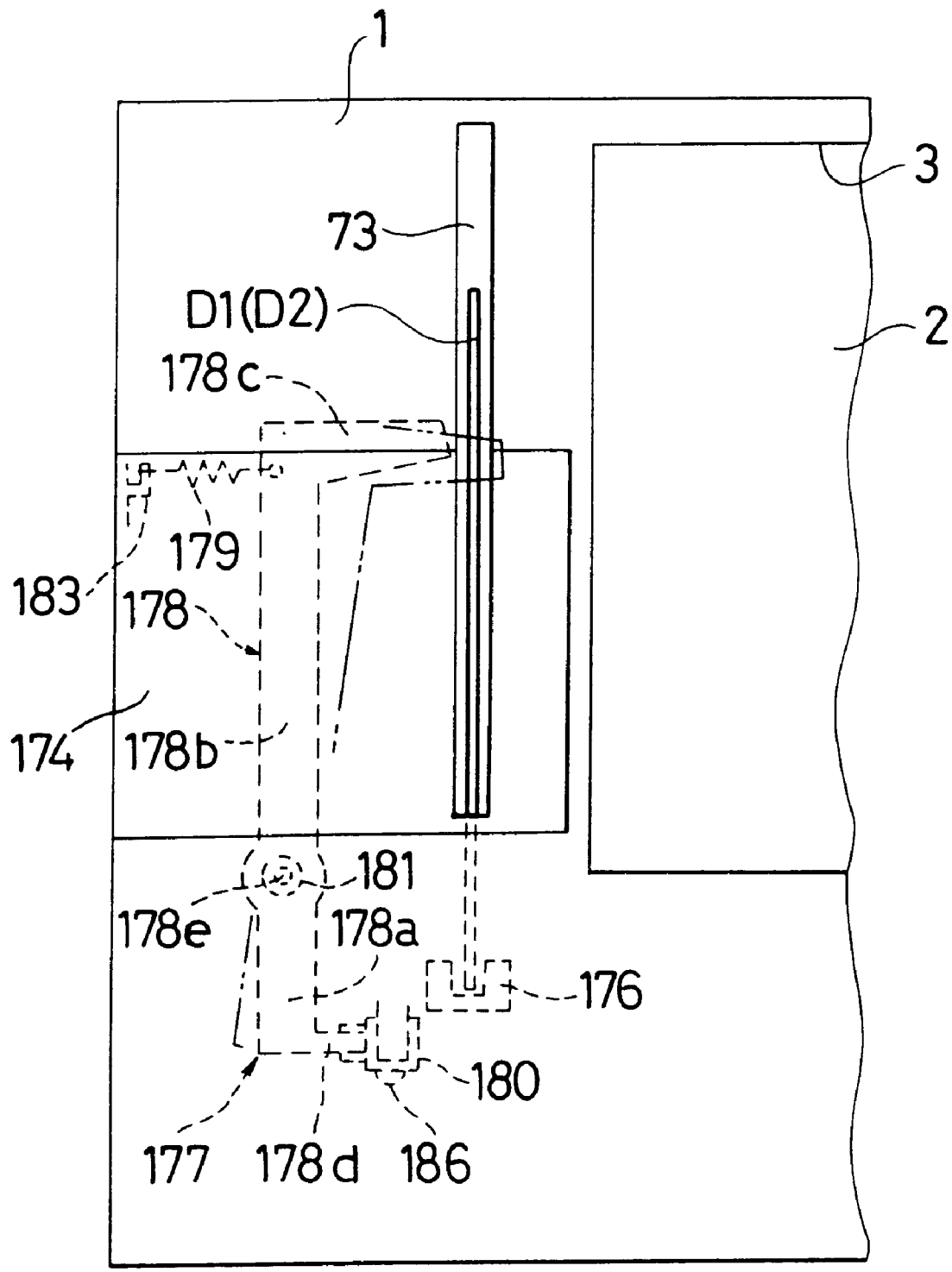
FIG. 28 is a front view of a disk inserting slit and its relevant components in the automatic disk changer.
Figure 29:
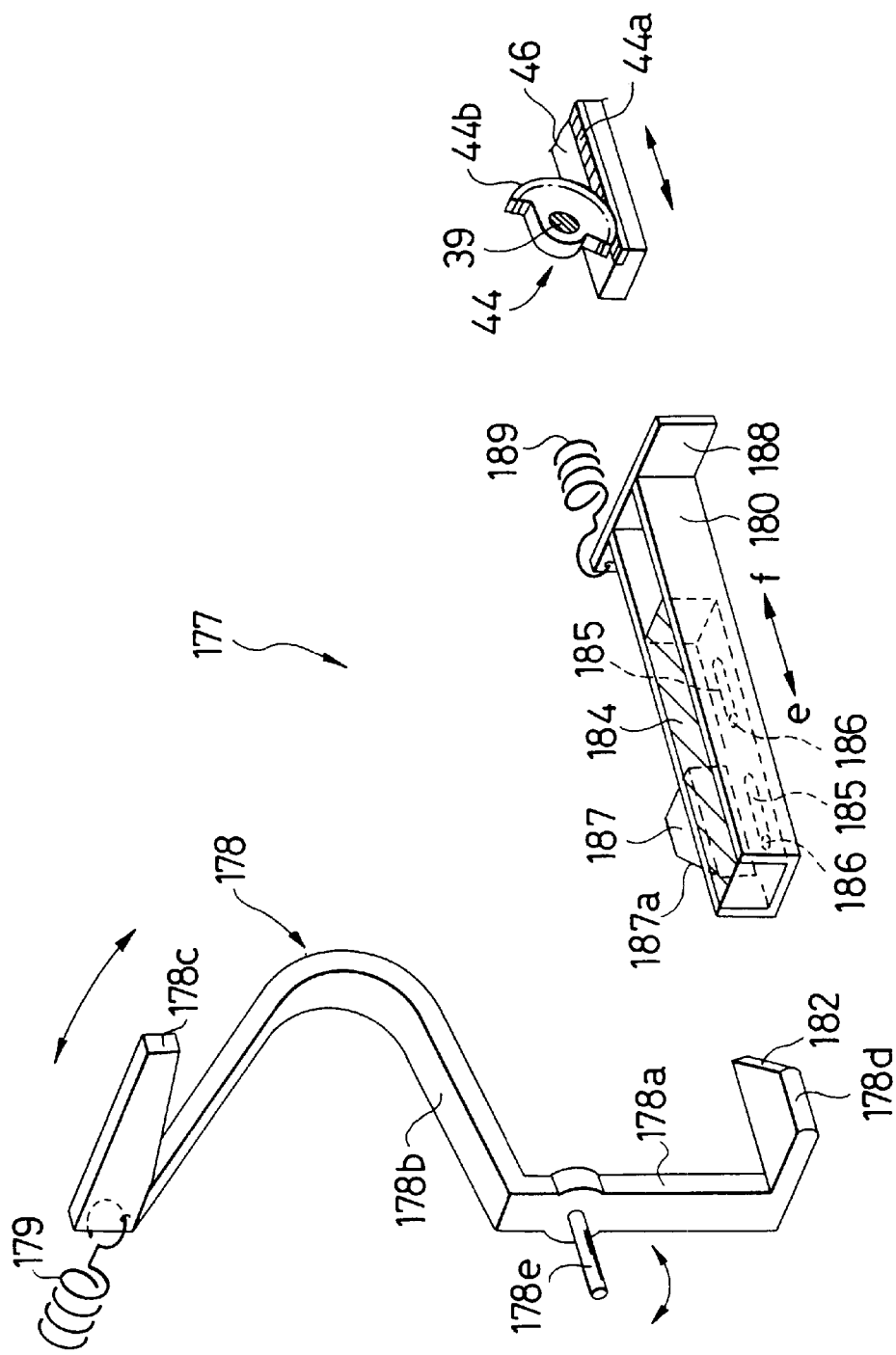
FIG. 29 is an exploded perspective view of a shutter mechanism in the automatic disk changer.

Under this condition, the one-disk start switch 5c is depressed. As a result, the loading mechanism 8 and the disk mounting mechanism 10 are operated in the above-described manner, and the disk D1 or D2 in the swing tray 74 is mounted on the play body 9. In this case, the swing frames 61 and 62 of the disk mounting mechanism 10 which are kept closed as shown in FIG. 2, is opened (as shown in FIG. 15), so that the operating bar 89 is moved forwardly, in the direction of the arrow e, with the aid of the operating board 64. As a result, the lock body 87 is pushed outwardly by the end of the operating bar 89, so that the hook 87b of the lock body 87 is engaged with the lock pin 86 as shown in FIG. 24(*a*). Thereafter, the disk D1 or D2 is clamped between the front and rear arms 40 and 41 of the loading mechanism 8, and is delivered to the disk mounting mechanism 10 (cf. FIGS. 12 and 13), whereby the rear coupling bar 46 is moved forwardly, in the direction of the arrow e, until the front end of the rear coupling bar 46 abuts against the rear end face of the lock body 87.

Thereafter, when the swing frame 61 and 62 of the disk mounting mechanism 10, which are kept opened (as shown in FIG. 15), is closed as shown in FIG. 17, the operating bar 89 is moved backwardly (in the direction of the arrow f) whereby the front end of the operating bar 89 is spaced away from the lock body 87 as shown in FIG. 24(*b*). However, since the front end of the coupling bar 46 is abutted against the rear end face of the lock body 87 as was described above, the lock body 87 is not retracted by the spring 88; that is, the hook 87b of the lock body 87 is maintained engaged with the lock pin 86.

Hence, when the disk D1 or D2 inserted with the aid of the swing tray 74 is played, the swing tray 74 is locked by the locking mechanism 75, and therefore the swing tray 74 is prevented from being forcibly pulled out of the casing 1.

After the disk D1 or D2 has been played, it is returned to the swing tray 74 with the above-described operations performed in the reverse order, so that the rear coupling bar 46 is moved backwardly (in the direction of the arrow f). As a result, the lock body 87 is moved backwardly by the spring 88, so that the hook 87b is spaced from the lock pin 86. Thus, the swing tray 74 is so restored that it is swingable again (cf. FIG. 23(*b*)).

Thereafter, the swing tray 74 is pulled forwardly with the finger set in the recess 84 of the swing tray 74; that is, the swing tray 74 is pulled out of the casing, whereby the disk D1 or D2 can be taken out of the swing tray 74.

The locking mechanism 75 adapted to lock the swing tray 74 is simple in structure and small in the number of components. Hence, it can be manufactured at low cost.

As is apparent from the above description, the first embodiment of the invention has the following effects or merits:

In the automatic disk changer of the first embodiment, among a number of disks inserted into the casing through the opening, a desired one is specified and played, and merely by inserting a disk which has been newly purchased into the casing with the aid of the swing tray, the new disk is played. Hence, the structure for playing one particular disk besides a number of disks is simple, and accordingly low in manufacturing cost.

On the other hand, when the disk is being played which has been inserted into the casing with the aid of swing tray, in association with this operation the swing tray is locked by the locking mechanism. Hence, the automatic disk changer is free from the difficulty that the swing tray is unintentionally swung, and another disk is set in the swing tray.

Second Embodiment

Another automatic disk changer, which constitutes a second embodiment of the invention, will be described. However, it should be noted that the second embodiment is fundamentally equal to the first embodiment, and therefore only parts of the second embodiment which are different from those of the first embodiment will be described.

As shown in FIGS. 26 through 29, a disk inserting slit 73 is formed in such a manner that it confronts with the carriage 7 which is stopped at the standby position. A front supporting stand 175a and a rear supporting stand 175b which support the bottom of a disk D1 or D2 is provided in such a manner that they confronts with the slit 73. A front disk locking frame 42 is passed through the space between the two supporting stands 175a and 175b. In addition, a photodetector 176 is provided which comprises a light emitting unit and a light receiving unit to detect a disk D1 or D2 set on the supporting stands 175a and 175b. Furthermore, a shutter mechanism 177 for closing the slit 73 is provided. The shutter mechanism 177 comprises a shutter body 178, a spring 179 which urges the shutter body 178 to move away from the slit 73, and a slider 180 provided between the shutter body 178 and the coupling bar 46 of the front arm 40.

The shutter body 178 comprises: a vertical bar 178a which is extended vertically along the lower portion of the front wall of the casing 1; a curved bar 178b which is extended from the upper end of the vertical bar 178a upwardly along the inner surface of a recess 174 of the casing 1; a horizontal bar 178c which is extended horizontally from the upper end of the curved bar 178b towards the slit 73; and a horizontal piece 178d which is extended horizontally from the lower end of the vertical bar 178a towards the slider 180. A supporting shaft 178e, which is extended from the upper end of the vertical bar 178a, is swingably inserted in a boss 181 formed in the front wall of the casing 1, so that the shutter body 178 is swung about the supporting shaft 178e. The rear edge portion of the horizontal piece 178d has a sloped surface 182.

The spring 179 is connected between the horizontal bar 178c of the shutter body 178 and a locking piece 183 formed on the side wall of the casing 1, to urge the horizontal bar 178c to move away from the slit 73.

The slider 180 is a frame U-shaped in cross section, which is movably mounted on a rectangular-prism-shaped stationary guide 184 which is protruded from the disk arranging stand 6. The slider 180 has a pair of front and rear elongated holes 185 in the bottom, and supporting members 186 such as bolts are extended from the bottom of the guide 184 through the elongated holes 185, whereby the slider 180 is supported by the stationary guide 184 in such a manner that it is movable within a predetermined distance in the directions of the arrows e and f. The slider 180 has a trapezoidal cam 187 on its one side surface, in such a manner that the front sloped surface 187a of the cam 187 is abutted against the sloped surface 182 of the aforementioned horizontal piece 178d. Furthermore, the slider 180 has a rear end plate 188 at the rear end, in such a manner that one end portion of the rear end plate 188 is confronted with the coupling bar 46 of the front arm 40. The other end portion of the rear end plate 188 is connected to a spring 189 to urge the slider 180 backwardly.

Figure 30A:
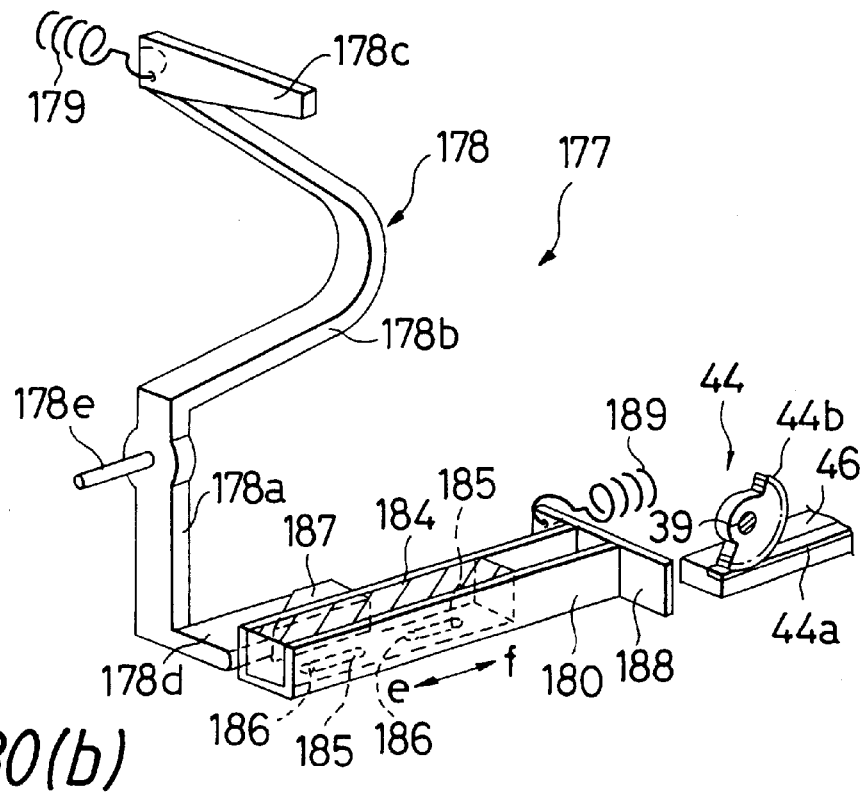
FIGS. 30(a) and 30(b) are perspective views for a description of the operation of the shutter mechanism shown in FIG. 29.

Now, it is assumed that, in the disk changer thus constructed, no disk D1 or D2 is inserted in the disk inserting slit 73. In this case, as shown in FIG. 30(a), the slider 180 has been moved backwardly (in the direction of the arrow f), and therefore the horizontal bar 187c of the shutter body 178 is spaced away from the slit 73 by the spring 179 (cf. FIG. 28), so that a particular disk D1 or D2, for instance, a newly purchased disk can be inserted into the slit 73 (cf. FIG. 27).

Figure 30B:
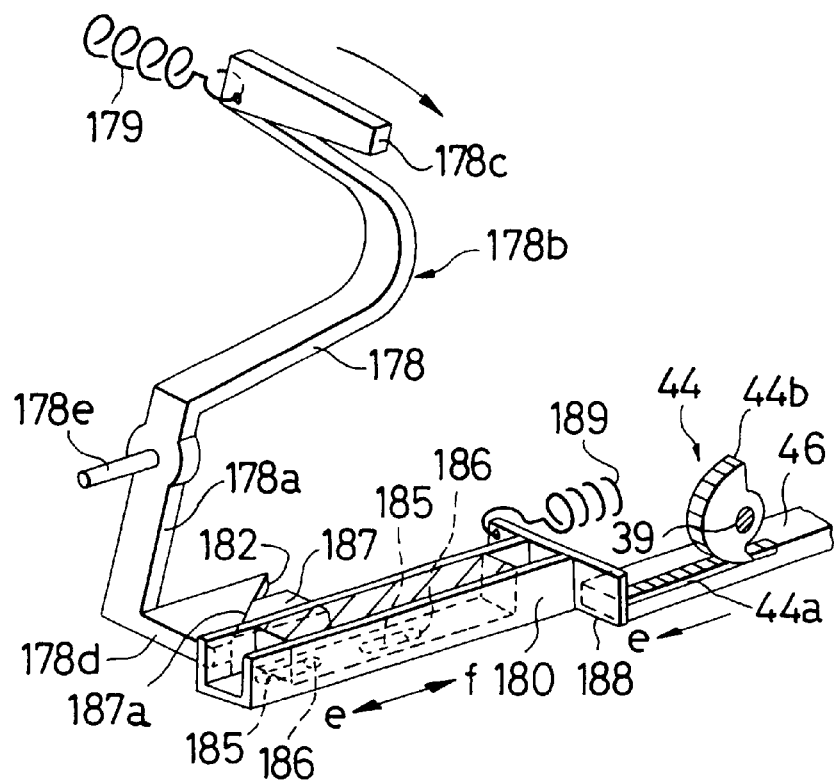

When a disk D1 or D2 is inserted into the slit 73, the insertion is detected by the photo-detector 176. Hence, upon depression of the one-disk start switch 5c, the loading mechanism 8 and the disk mounting mechanism 10 are operated in the above-described manners, so that the disk D1 or D2 in the slit 73 is mounted on the player body 9. In this case, as shown in FIG. 30(b), the loading mechanism 8 operates to move the coupling bar 46 of the front arm 40 forwardly (in the direction of the arrow e), so that the slider 180 is moved forwardly (in the direction of the arrow e) by the front end of the coupling bar 46 against the elastic force of the spring 189. As a result, the sloped surface 182 of the shutter body 178 is pushed by the sloped surface 187a of the trapezoidal cam 187, so that the shutter body 178 is turned about the supporting shaft 178e against the elastic force of the spring 179; that is, the slit 73 is closed by the horizontal bar 178c of the shutter body 178 (cf. the phantom lines in FIG. 28). Hence, the disk changer is free from the difficulty that, while the disk D1 or D2 inserted in the slit 73 is being played, another disk D1 or D2 is inserted into the slit 73.

When the reproduction of data from the disk D1 or D2 inserted into the slit 73 has been accomplished, the disk D1 or D2 is returned to its original position with the above-described operations performed in the reversed order. Therefore, the disk D1 or D2 can be pulled out of the slit 73 with the finger set in the recess 174. As is apparent from the above description, merely by adding some structure to the structure adapted to play a number of disks D1 and D2 inserted through the opening 3, a particular disk D1 or D2 besides those disks can be played. The structure thus added is simple and low in manufacturing cost.

The second embodiment of the invention has the following effects or merits:

With the automatic disk changer of the second embodiment, among a number of disks inserted into the casing through the disk loading and unloading opening, a desired one is specified and played, and in addition, for instance a newly purchased disk can be played merely by inserting it into the disk inserting slit. Hence, the structure for playing a particular disk besides a number of disks is simple and low in manufacturing cost.

Furthermore, when the disk inserted into the disk inserting slit is being played, the disk inserting slit is kept closed. Hence, the automatic disk changer is free from the difficulty that, when the disk inserted into the disk inserting slit is being played, another disk is inserted into the slit.

What is claimed is:

1. An automatic disk changer comprising:

a loading mechanism which loads a specified one among a number of disks which have been inserted into a casing through an opening which is formed in the casing so that disks are inserted in or taken out of the casing;

a disk mounting mechanism which receives the specified disk from said loading mechanism and mounts the specified disk on a player body;

a disk inserting slit which is formed in a front wall of the casing in such a manner that said slit is adjacent to the opening, and only one disk is inserted into said slit; and a shutter mechanism which closes said disk inserting slit in association with the mounting of the disk, which has been inserted into said slit, on the player body in response to movement of said loading mechanism, wherein said shutter mechanism comprises: a shutter body pivotally supported by the casing; and a spring which urges said shutter body to move said shutter body away from said disk inserting slit, wherein a slider is provided between said shutter body and said loading mechanism, and wherein, in association with the mounting of the disk, which has been inserted into said slit on the player body, in response to movement of said loading mechanism, said slider is pushed out, so that said shutter body is swung against an elastic force of said spring, whereby said disk inserting slit is closed by said shutter body.

2. The automatic disk changer as claimed in claim 1, wherein a disk detector for detecting when a disk is inserted into said disk inserting slit is provided in the casing.

3. An automatic disk changer comprising:

a disk arranging stand on which a number of disks are arranged at predetermined intervals which are inserted into a casing through an opening which is formed in the casing so that disks are inserted in or taken out of the casing through the opening;

a carriage which is reciprocated along said disk arranging stand, said carriage including a loading mechanism which clamps a predetermined one among the number of disks on said disk arranging stand and delivers the predetermined disk onto said carriage, and a disk mounting mechanism which mounts the disk which has been thus delivered onto said carriage, on a player body;

a disk inserting slit which is formed in a front wall of the casing in such a manner that said slit is adjacent to the opening, and only one disk is inserted into said slit; and a shutter mechanism which closes said disk inserting slit in association with the mounting of the disk, which has been inserted into said slit, on the player body in response to movement of said loading mechanism, wherein said shutter mechanism comprises: a shutter body pivotally supported by the casing; and a spring which urges said shutter body to move said shutter body away from said disk inserting slit, and wherein a slider is provided between said shutter body and said loading mechanism, and wherein in association with the mounting of the disk, which has been inserted into said slit, on the player body in response to movement of the loading mechanism, said slider is pushed out, so that said shutter body is swung against an elastic force of said spring, whereby said disk inserting slit is closed by said shutter body.

4. The automatic disk changer as claimed in claim 3, wherein a disk detector for detecting when a disk is inserted into said disk inserting slit is provided in the casing.

* * * * *